(12) United States Patent
Murphy et al.

(10) Patent No.: US 12,430,909 B2
(45) Date of Patent: Sep. 30, 2025

(54) AIR AND SEA BASED FISHING DATA COLLECTION AND ANALYSIS SYSTEMS AND METHODS

(71) Applicant: Raymarine UK Limited, Fareham (GB)

(72) Inventors: Adam Murphy, Manchester, NH (US); Mark Johnson, Vannes (FR)

(73) Assignee: Raymarine UK Limited, Fareham (GB)

( * ) Notice: Subject to any disclaimer, the term of this patent is extended or adjusted under 35 U.S.C. 154(b) by 0 days.

(21) Appl. No.: 17/636,838

(22) PCT Filed: Aug. 27, 2020

(86) PCT No.: PCT/US2020/048136
§ 371 (c)(1),
(2) Date: Feb. 18, 2022

(87) PCT Pub. No.: WO2021/041629
PCT Pub. Date: Mar. 4, 2021

(65) Prior Publication Data
US 2022/0301302 A1    Sep. 22, 2022

Related U.S. Application Data

(60) Provisional application No. 62/893,772, filed on Aug. 29, 2019.

(51) Int. Cl.
*G06V 20/17* (2022.01)
*B64U 10/14* (2023.01)
(Continued)

(52) U.S. Cl.
CPC .......... *G06V 20/17* (2022.01); *G01C 21/20* (2013.01); *G05D 1/0094* (2013.01); *G05D 1/104* (2013.01);
(Continued)

(58) Field of Classification Search
CPC ...... G06V 20/17; G06V 10/25; G06V 10/764; G06V 10/82; G06V 20/05; B64U 10/13;
(Continued)

(56) References Cited

U.S. PATENT DOCUMENTS 9,989,965 B2 *   6/2018  Cuban ................. G05D 1/0202
11,055,872 B1 *  7/2021  Chen ..................... G06V 10/764
(Continued)

FOREIGN PATENT DOCUMENTS

JP         2014055883 A     3/2014
WO     WO-2018045354 A2 *  3/2018  .......... B64C 39/024
(Continued)

OTHER PUBLICATIONS

SKYbrary, "Detection of Bird Activity Using Radar", 2020. [URL: https://www.skybrary.aero/index.php/Detection_of_Bird_Activity_Using_Radar].
(Continued)

*Primary Examiner* — Helal A Algahaim
*Assistant Examiner* — John D Holman
(74) *Attorney, Agent, or Firm* — Haynes and Boone, LLP

(57) ABSTRACT

Flight based marine object search, detection and identification systems and related techniques include an unmanned aerial system (UAS) having a flight platform configured to execute a search path to search for an underwater object, an imaging system comprising image capture components configured to generate a stream of images corresponding to a field of view of the UAS, and a logic device associated with the UAS and configured to analyze the stream of images using a marine video analysis (MVA) system to detect a region of interest comprising an underwater object, identify an underwater object in the detected region of interest, and notify a mobile structure of the identified object.

18 Claims, 18 Drawing Sheets

(51) Int. Cl.
  *B64U 70/93* (2023.01)
  *B64U 101/30* (2023.01)
  *G01C 21/20* (2006.01)
  *G05D 1/00* (2024.01)
  *G06V 20/05* (2022.01)

(52) U.S. Cl.
  CPC ............. *G05D 1/106* (2019.05); *G06V 20/05* (2022.01); *B64U 10/14* (2023.01); *B64U 70/93* (2023.01); *B64U 2101/30* (2023.01)

(58) Field of Classification Search
  CPC ............... B64U 70/00; B64U 2101/20; B64U 2101/30; H04N 7/183; G05D 1/0094; G01C 21/20; B64C 39/024; A01K 29/005
  USPC ............................................................ 701/3
  See application file for complete search history.

(56) References Cited

U.S. PATENT DOCUMENTS

| | | |
|---|---|---|
| 2016/0282131 A1 | 9/2016 | Palfreyman |
| 2017/0213465 A1* | 7/2017 | Parekh ................... G08G 5/59 |
| 2018/0107210 A1 | 4/2018 | Harnett et al. |
| 2019/0014760 A1 | 1/2019 | Twining et al. |
| 2019/0172348 A1 | 6/2019 | Rivers et al. |
| 2019/0258883 A1* | 8/2019 | Britto Mattos Lima ................... G06V 20/182 |
| 2020/0326418 A1 | 10/2020 | Keijer et al. |
| 2022/0043112 A1 | 2/2022 | Stokes et al. |
| 2022/0301302 A1 | 9/2022 | Murphy et al. |

FOREIGN PATENT DOCUMENTS

| | | |
|---|---|---|
| WO | WO 2019/200178 A1 | 10/2019 |
| WO | WO 2021/041629 A1 | 3/2021 |

OTHER PUBLICATIONS

Malsev, Kosta et al., "Processing of Weather Radar Images for Bird Detection and Tracking," IASTED Conference on Visualization, Imaging and Image Processing (VIIP), 2007.
Buss, Irven O., "Bird Detection by Radar," The Auk: Ornithological, vol. 63, No. 3, Jul. 1946, pp. 315-318.
BBC News, "Radar captures huge bird migration over Florida," Feb. 2020. [URL: https://www.bbc.com/news/world-us-canada-51545711].
Quora.com, "Can a radar detect birds," 2017. [URL: https://www.quora.com/Can-a-radar-detect-birds].
Dokter, Adriaan M. et al., "Bird detection by operational weather radar," Scientific Report, WR Jun. 2009, 2009.
Urmy, Samuel S., et al., "Quantitative ornithology with a commercial marine radar: standard-target calibration, target detection and tracking, and measurement of echoes from individuals and flocks," Methods in Ecology and Evolution, vol. 8, pp. 860-869, 2017.
Furuno, "DRS 6A X-Class Features", 2016. [URL: https://www.furuno.com/special/en/radar/drs6ax-class/#Features].
Gauthreaux, Sidney A., Jr., "Radar Technology to Monitor Hazardous Birds at Airports", Wildlife in Airport Environments: Preventing Animal-Aircraft Collisions through Science-based Management, 2013, pp. 141-151.
Kusrad, Avian Radar, 2020.
Ozcan, Abdullah H., et al., "Micro-Doppler effect analysis of single bird and bird flock for linear FMCW radar," 20th Signal Processing and Communications Applications Conference (SIU), Apr. 2012 (English Abstract).

* cited by examiner

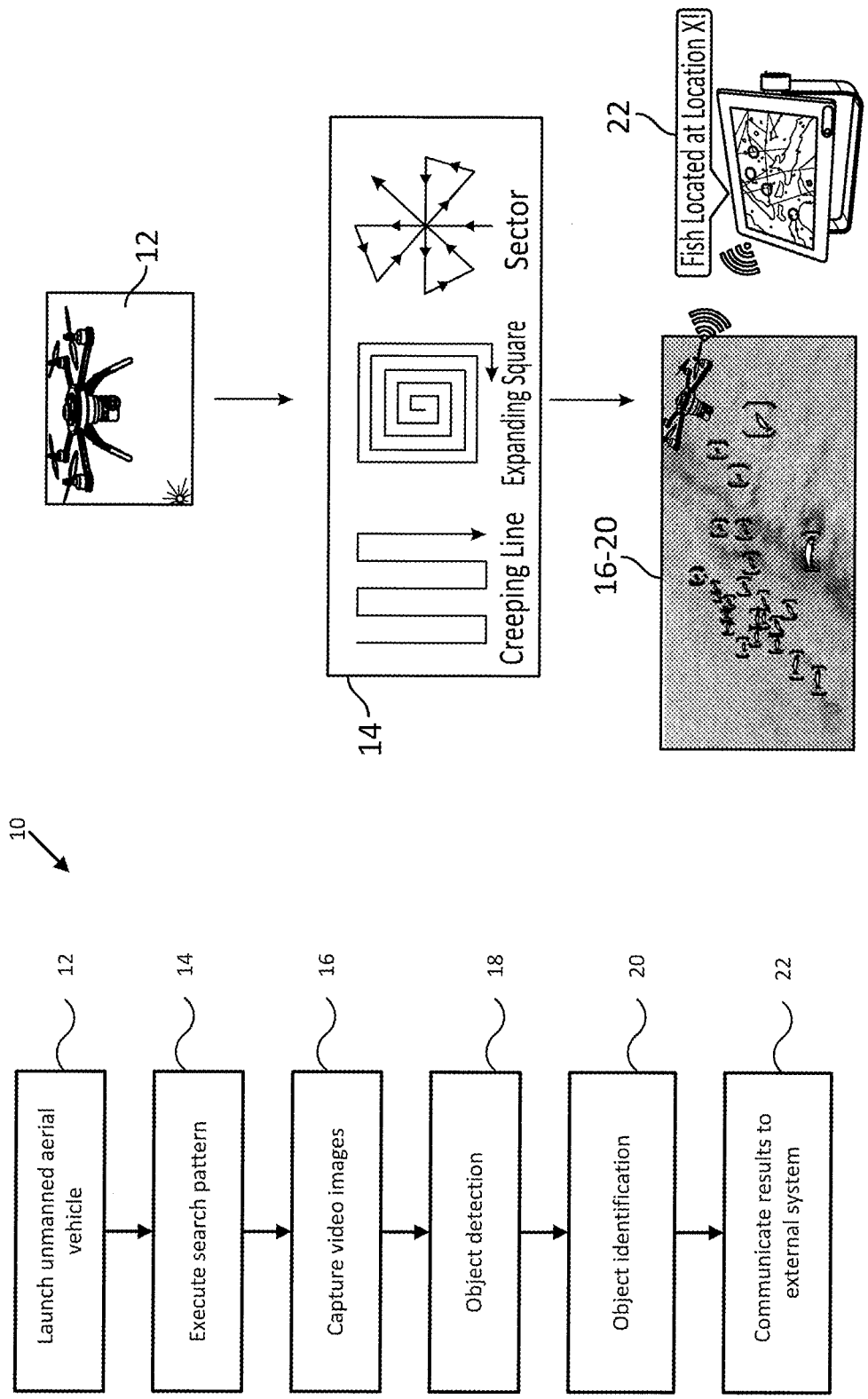

Accessing Information and Options for One of the Drones, Via Electronic Chart Application Electronic Chart Showing Overview of Multiple Drones Running Search Patterns, Controlled from Boat MFD (e)

AIR AND SEA BASED FISHING DATA COLLECTION AND ANALYSIS SYSTEMS AND METHODS

CROSS-REFERENCE TO RELATED APPLICATIONS

This patent application is a U.S. National Stage Patent Application under 35 U.S.C. 371 of International Patent Application No. PCT/US2020/048136 filed Aug. 27, 2020 and entitled "AIR AND SEA BASED FISHING DATA COLLECTION AND ANALYSIS SYSTEMS AND METHODS," which claims priority to and benefit of U.S. Provisional Patent Application No. 62/893,772 filed Aug. 29, 2019 and entitled "AIR AND SEA BASED FISHING DATA COLLECTION AND ANALYSIS SYSTEMS AND METHODS," which are hereby incorporated by reference in their entirety.

U.S. Provisional Patent Application No. 62/893,772 is related to U.S. Utility application Ser. No. 16/273,011, filed Feb. 11, 2019, and titled "UNMANNED AERIAL SYSTEM ASSISTED NAVIGATIONAL SYSTEMS AND METHODS," which is hereby incorporated by reference in its entirety.

TECHNICAL FIELD

The present invention relates generally to marine detection systems and, more particularly for example, to system and methods for locating, detecting and/or identifying fish and other marine objects.

BACKGROUND

Locating fish and other marine objects is a difficult task. For example, a boat or other marine vessel may include a variety of sensors which are used to help guide fishermen to locations where fish are present and feeding. These vessel-based sensors are limited based on the installation point and orientation of the sensor on the vessel. As a result, the ability to "scout" for fish is restricted by a number of factors including but not limited to the speed of the boat, the range of the sensors, the owner's willingness to consume fuel while searching for a location, and the time available for fishing. Additionally, conventional sensors provide near real-time data which leaves users with the responsibility of constantly monitoring their sensors and using personal recollection to identify and analyze the most productive fishing locations.

One method for locating fish is by visually identifying fish from an elevated point on the vessel, such as a "tuna tower". This elevated perspective allows the user to overcome the reflective glare of the water surface and see fish below the water line. Typically, the higher and more perpendicular the perspective, the greater the user's ability to see beneath the surface. While effective, this method is also limited to the immediate vicinity of the vessel and doesn't alleviate the other factors when scouting for fish.

In view of the foregoing and other limitations with conventional systems, there is a continued need in the art for improved fish (and other marine object) location, detection and identification systems.

SUMMARY

Flight based marine object search, detection and identification systems and related techniques include an unmanned aerial system (UAS) having a flight platform configured to execute a search path to search for an underwater object, an imaging system comprising image capture components configured to generate a stream of images corresponding to a field of view of the UAS, and a logic device associated with the UAS and configured to analyze the stream of images using a marine video analysis (MVA) system to detect a region of interest comprising an underwater object, identify an underwater object in the detected region of interest, and notify a mobile structure of the identified object.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1A and FIG. 1B illustrate a flow diagram illustrating an operation of a marine object search, detection and identification system in accordance with one or more embodiments of the present disclosure.

DETAILED DESCRIPTION

Figure 1C:
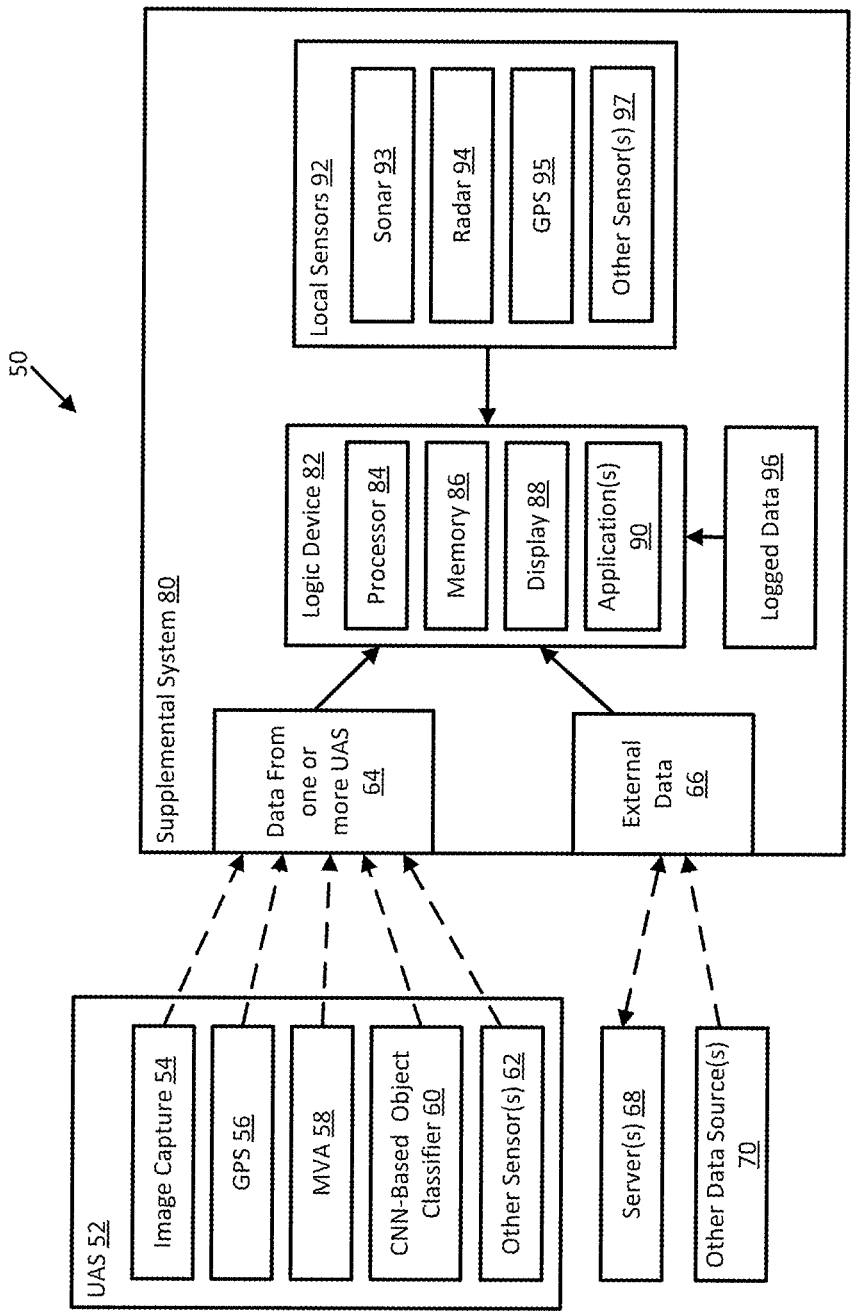
FIG. 1C illustrates a block diagram of a system data flow in accordance with one or more embodiments of the disclosure.

Embodiments of the present invention and their advantages are best understood by referring to the detailed description that follows. It should be appreciated that like reference numerals are used to identify like elements illustrated in one or more of the figures.

Systems and methods are provided for locating, detecting and/or identifying fish and other marine objects. In various embodiments, a system includes an unmanned aerial system (UAS) including an image capture device such as a visible light, near-infrared and/or infrared spectrum camera, a data analytics engine and a global positioning satellite (GPS) navigation system. The image capture device is mounted to the UAS to capture images of marine objects (both on the surface and beneath the surface) from an aerial position during flight. The data analytics engine may include marine video analytics (MVA) engine to analyze captured video images and detect one or more desired objects, and an object identification/classification system (e.g., a convolutional neural network CNN) trained to identify fish, debris, birds and/or other marine objects from images captured from an aerial position.

The system is configured to execute one or more manual and/or automatic procedures to detect and/or identify one or more marine objects. After an object is detected and/or identified the system can be configured to alert an operator to the object's location and/or identification. For example, the UAS may be in communication with the multi-function display or other processing systems of a vessel to share data, analysis, location and other information regarding the search and detection operations. The UAS's navigation equipment and/or vessel navigation equipment may be used to guide the operator and/or the vessel to the object's location.

Referring to FIGS. 1A and 1B, an example operation of a system in accordance with one or more embodiments will be described. A search and identification process 10 begins with the launch of an unmanned aerial vehicle in step 12. The UAS may be launched from a mobile structure (e.g., a boat) that includes a multi-function display (MFD) or other processing system configured for communication with the UAS. The UAS executes a search pattern (step 14) to control the flight path of the UAS to search for desired objects, which may include a particular species of fish in a fish finding operation, a person or vessel in a search and rescue operation, or another desired object. The search pattern may originate from the mobile structure or another known location and proceed in a pattern that may include a creeping line pattern, an expanding square pattern, a sector pattern or other search pattern. The search pattern may further include (i) searching in an area proximate to one or more GPS locations based on data of known or expected locations of the desired object, (ii) automatically adjusting the search in response to received sensor data, and/or (iii) modifying the search in response to manual commands from an operator.

During the search, the UAS captures video images from an aerial position above the water (step 16). The UAS may include one or more image capture devices arranged to capture a stream of images of the water below (e.g., arranged to capture images of the water directly below the UAS within a field of view). The image capture device may include visible, near-infrared and/or infrared imaging sensors in various embodiments. The flight pattern of the UAS may be further controlled to maintain a height and/or orientation suitable and/or optimal for capturing images of sufficient quality for use in object detection and identification processes described herein. The flight controls may include, for example, orienting the image capture devices away from the sun to avoid glare, adjusting an altitude of flight down to capture a clearer and/or larger picture of an object for improved image processing, adjusting the altitude up to increase a field of view and/or avoid a vessel or waves, or other adjustments as may be desired.

The stream of captured video images is analyzed to detect the presence of objects (step 18). The image analysis may be performed in real-time or near-real time onboard the UAS. In some embodiments, the object detection is performed by a marine video analytics (MVA) system that performs an analysis of the captured image to detect the possible presence of an object of interest. The MVA may utilize information including expected size, shape, and/or color of a desired objects. In some embodiments, the MVA is configured to detect water or "not water" (e.g., object detected) in regions of a captured image. For example, the MVA may be adapted to identify a horizon in an image and identify objects above the water line. In some embodiments, the object detection process 18 further includes analyzing whether the quality of the image is sufficient for object identification. For example, a detected object may be determined to be too small (e.g., not comprising enough pixels for identification of the object) or may be obscured by glare. If the object detection process determines that a better-quality image is available, it may instruct the UAS to maneuver to get a better view, which may include moving closer to the detected object, positioning the sun behind the camera, and/or other maneuvers.

If an object is detected, the image and/or a portion of the image including the detected object (e.g., a region of interest) is passed to an object identification process 20 for further analysis and identification/classification of the detected object. In some embodiments, the object identification process 20 includes a convolutional neural network (CNN) trained to identify objects of interest from marine images captured as described herein. If an object is identified by the CNN, the location of the object, an identification of the object, the time, the date, and/or other data and results are communicated to an external system (step 22), such as a mobile structure. In various embodiments, the UAS may conduct a search until a desired object is detected, continue searching for other instances of the desired object at other locations, track the detected object until the mobile structure is in the vicinity, and/or perform other functions. In some embodiments, both the object detection and classification may be performed with the CNN, and without use of the MVA.

Referring to FIG. 1C, data flow and processing for a marine search, detection and identification system 50 will now be described in accordance with one or more embodiments. In various embodiments, a UAS 52 includes sensors that capture data and processing components that analyze and generate data. The sensors and components include image capture components 54 to capture images of the marine environment, global positioning satellite components 56 to determine the location of the UAS and/or detected objects, an MVA 58 to detect an object in a captured image and identify a region of interest for further processing, a CNN-based object classifier 60 to identify an object appearing in the region of interest, and/or other sensors 62. The captured/generated data is communicated to a supplemental system 80 and received and stored as data from UAS 64 for further processing.

The supplemental system 80 may comprise a mobile structure (e.g., a boat or other vessel) with a plurality of local sensors 92 and processing components, such as logic device 82. The local sensors 92 may include a sonar system 93, a radar system 94, a GPS navigation system 95, and/or other sensors 97 (e.g., wireless communications components). The logic device 82 includes a processor 84, memory 86, display 88 and one or more applications 90 for processing the data received from the UAS 52, local sensors 92, external data 66 and logged data 96. The logic device 82 is configured to use data from the local sensors 92 to detect and identify objects and record their geographical location, which may include objects deep within a water column that are not detectable by the UAS 52. The sonar system 93 can also record sea surface temperature and estimate sea bottom density/material based on sonar data. The applications 90 may include an integrated fish finding algorithm that can detect fish in the water column and an embedded convolutional neural network that can identify the fish species and size.

Data from the UAS and sonar systems can be combined, searched, filtered, analyzed, and further combined with other available data to provide reporting and recommendations for future fish locations. These reports and recommendations can be rendered on a display to an operator or as an overlay on cartographic, sonar or navigation data. The data may include UAS data from one or more UAS's 52, external data 66 including data received from a server 68 or other data source 70 (e.g., recent fishing reports, map data, etc.), data from local sensors 92 and logged data 96 (e.g., previously received sensor data and/or processing results, such as previous detected fishing locations).

In operation, the UAS 52 is configured to capture video/images at a position with an advantageous visual perspective. The data from UAS 52 may supplement the limitations of surface-based sensors (e.g., limitations of local sensors 92) and vessels (range, speed, height, etc.). The UAS 52 is configured with marine video analytics 58 that can locate water-based objects from captured images, deep learning algorithms (e.g., CNN-based object classifier 60) that are trained to identify desired marine objects and experience-based insights (e.g., logged data 96 and/or external data 66) that allow for a completely autonomous search process. The systems and methods of the present disclosure may be implemented to detect and identify a variety of objects including, but not limited to individual fish, bait balls (groups of fish), floating debris, seaweed patches, birds, vessels, person(s) in the water (e.g., person overboard). After identification of the object, further analysis may be conducted to achieve a desired result for the user. For example, fish may be found by detecting the fish in a video image, or by detecting other objects that are known to be located in the vicinity of certain fish, such as birds that feed on fish, seaweed patches that fish feed on, debris around which fish congregate. The operator may analyze the results and make a determination regarding whether to navigate to the object location.

In various implementations, the system 50 includes a UAS system (e.g., UAS 52) and vessel systems (e.g., local sensors 92, including sonar, radar, GPS, etc.), which are configured to collect environmental data. Examples of the environmental data collected by these system sensors include date and time, GPS location, sea surface temperature, fish location and depth (from sonar-based fish alarm), fish type and size (from sonar-based CNN), bottom density and composition estimation (e.g., from sonar-based bottom material algorithm), bird flock size and location (from radar-based algorithm), and other data.

Data from both UAS 52 and vessel-based local sensors 92 may be amalgamated in real-time and/or stored as logged data 96 for the use of future fishing location recommendations. Data may be manually filtered to display only desired information, and/or used in an automatic data analysis process that provides recommended fishing locations with an associated confidence level of finding fish at each location. CNN supported fish identification/location tracking allows for additional filtering/customer analysis for users that are in pursuit of a specific species.

In various embodiments, the MVA 58 and/or CNN 60 processing may be implemented on a processing system embedded within the UAS 52 as illustrated, in the supplemental system 80 of a mobile structure (e.g., through an application 90 that processes image data received from the UAS 52), through a networked or cloud computing system (e.g., server 68) or another component of the system. In one approach, the UAS 52 stores pre-trained MVA 58 and CNN 60 algorithms on the UAS 52 to facilitate real-time processing of images and sensor data captured by the UAS 52. The captured data and/or analysis results may then be exported to another system, such as the supplemental system 80 (e.g., a vessel MFD). The exported data from one or more UAS 64 may include, but is not limited to, MVA notation objects (e.g., located object brackets as illustrated in FIG. 1B), CNN notation objects and labels (e.g., identified object brackets and/or object classification labels), object location(s), UAS location, UAS telemetrics, camera position, and other UAS data outputs.

In some systems, the MVA/CNN processing is performed by a multi-function display (MFD) of a vessel. The MFD may be configured to perform multi-sensor system processing (UAS, sonar, radar, etc.), receiving exported data from the UAS (e.g., raw or pre-processed UAS data) and other sensor data from the vessel-based sensors. The MVA/CNN may be provided as a separate logic device operable to communicated with the UAS 52 and the MFD of a vessel. The data may be output from the UAS and vessel-based sensors to the logic device. This configuration could also include additional hardware/software upgrades over standard UAS and vessel-based systems to facilitate various aspects disclosed herein. For example, the logic device unit may include a dedicated processing unit, radio frequency (RF) range-extender hardware/capabilities that may be implemented through a UAS remote control, hardware and software independence from UAS and MFD manufacturers and configurations, etc.

Figure 1D:
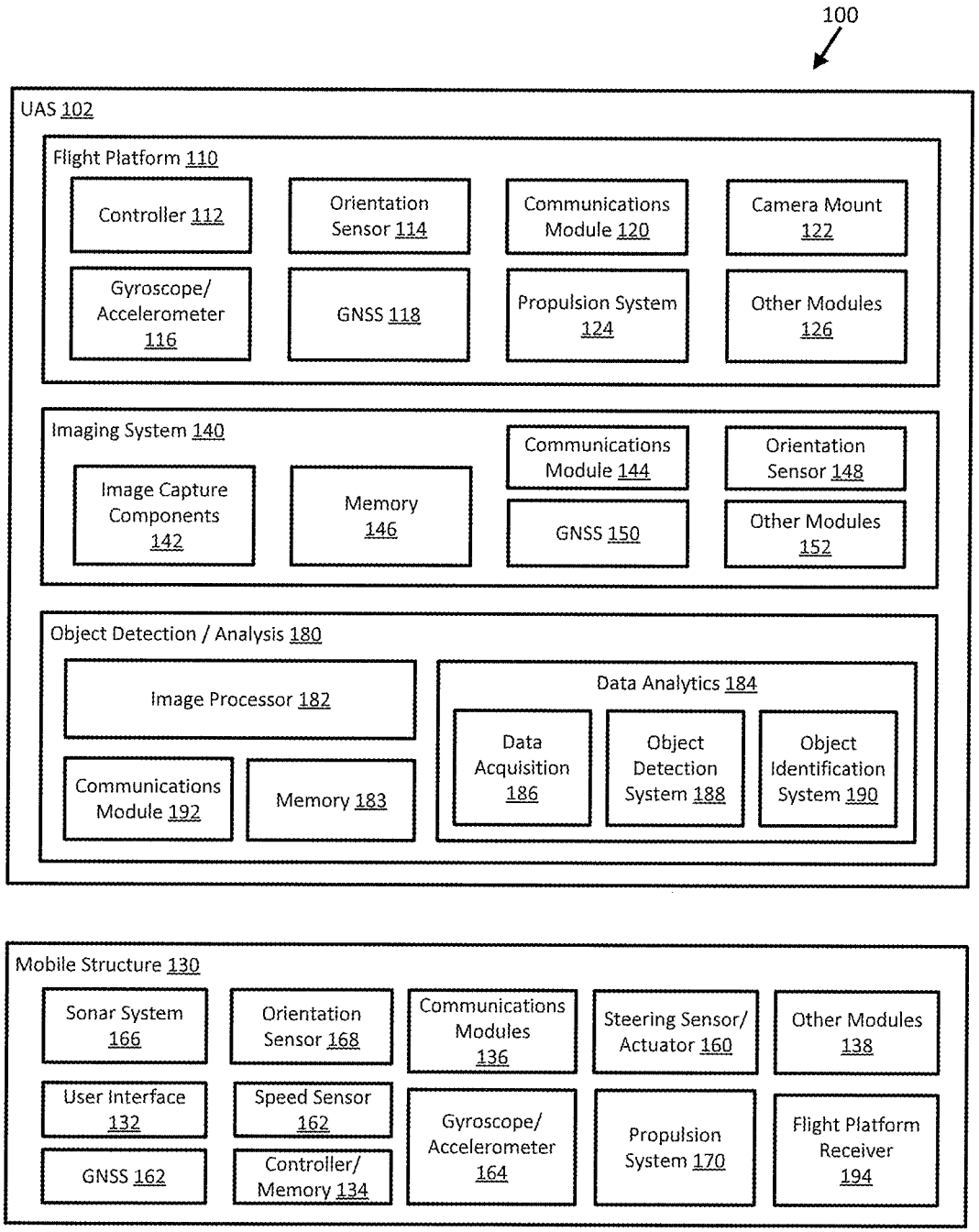
FIG. 1D illustrates a block diagram of a system in accordance with one or more embodiments of the disclosure.

FIG. 1D illustrates a block diagram of an object search and identification system 100 in accordance with one or more embodiments of the disclosure. In some embodiments, system 100 may include a mobile structure 130 and an unmanned aerial system 102 (UAS 102), which includes a flight platform 110, an imaging system 140, and an object detection and analysis system 180. Data generated by the imaging system 140 and/or sensors coupled to the flight platform 110 and/or mobile structure 130 may be processed (e.g., by object detection and analysis system 180, imaging system 140, flight platform 110, and/or mobile structure 130) and displayed to a user through use of user interface 132 (e.g., one or more displays such as a multi-function display (MFD), a portable electronic device such as a tablet, laptop, or smart phone, or other appropriate interface) and/or stored in memory (e.g., memory 146 of the imaging system 140, memory 183 of the object detection and analysis system 180, or controller/memory 134 of the mobile structure 130) for later viewing and/or analysis. In some embodiments, system 100 may be configured to use captured images to control operation of flight platform 110, imaging system 140, and/or mobile structure 130 as described herein, such as controlling a camera mount 122 to aim a camera towards a particular direction, controlling propulsion system 124 to move flight platform 110 to a desired position relative to a target, and/or providing navigation data for moving the mobile structure 130.

In various embodiments, the system 100 provides flight-based imaging and analysis systems and a related mobile structure 130 and centralized network systems to improve marine-based object search, detection and identification. In some embodiments, the UAS 102 may include one or more imaging systems 140 and other sensor systems and an object detection and analysis system 180 that may be configured to acquire and analyze data associated with a field of view of search, and a flight platform 110 for navigating the UAS 102 within a search area. The image data may be used to detect and identify marine objects, such as fish, aid in the piloting of the mobile structure towards an identified marine object, and/or in performing other tasks with the mobile structure and/or network systems (which may be accessed through communications modules 136).

In the illustrated embodiment of FIG. 1D, the flight platform 110 may be configured to fly and position and/or aim the imaging system 140 (e.g., relative to a designated or detected target) and may include one or more of a controller 112, an orientation sensor 114, a gyroscope/accelerometer 116, a global navigation satellite system (GNSS) 118, a communications module 120, a camera mount 122, a propulsion system 124, and other modules 126. Operation of flight platform 110 may be substantially autonomous and/or partially or completely controlled by an external source from, for example, mobile structure 130 (e.g., an operator and/or remote controller located on mobile structure 130), which may include one or more of a user interface 132, communications module 136, and other modules 138. Imaging system 140 may be physically coupled to flight platform 110 and be configured to capture images of a target position, area, and/or object(s) as selected and/or framed by operation of flight platform 110 and/or mobile structure 130.

In some embodiments, data from controller 112, orientation sensor 114 and/or 168, GNSS 118 and/or 162, communications module 120, 136, 144 and/or 192, other modules 126, 138, and/or 152, image capture components 142, and/or other components may be communicated to a secondary device (e.g., a smartphone, tablet, computer, network server, and/or other such device). Additionally, the secondary device may also communicate data to flight platform 110, mobile structure 130, and/or imaging system 140. Image capture components 142 may include sensors for capturing visible light, near-infrared, infrared or other spectrums. Reference may be made to thermal, infrared, radiant, radiance, and/or irradiance images and bands, which for the purposes of this disclosure, may be used generally to refer to temperature based (e.g., infrared wavelength) or thermal imaging.

Controllers 112 and 134, and image processor 182, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of flight platform 110 and/or other elements of system 100, for example. Such software instructions may also implement methods for processing captured images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 112 and/or 134. In these and other embodiments, controller 112 and/or 134 may be implemented with other components where appropriate, such as volatile memory, non-volatile memory, one or more interfaces, and/or various analog and/or digital components for interfacing with devices of system 100. For example, controller 112 and/or 134 may be adapted to store sensor signals, sensor information, parameters for coordinate frame transformations, calibration parameters, sets of calibration points, and/or other operational parameters, over time, for example, and provide such stored data to an operator using user interface 132. In some embodiments, controller 112 may be integrated with one or more other elements of flight platform 110, for example, or distributed as multiple logic devices within the UAS 102. In some embodiments, controller 134 may be integrated with one or more elements of mobile structure 130 or distributed as multiple logic devices within mobile structure 130.

Orientation sensor 114 may be implemented as one or more of a compass, float, accelerometer, and/or other device capable of measuring an orientation of flight platform 110 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of flight platform 110 and providing such measurements as sensor signals that may be communicated to other devices of system 100 (e.g., user interface 132, controller 112 and/or 134).

GNSS 118 may be implemented according to any global navigation satellite system, including a GPS, GLONASS, and/or Galileo based receiver and/or other device capable of determining absolute and/or relative position of flight platform HO (e.g., or an element of flight platform 110) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals from mobile structure 130 and provide them to controller 112 and/or propulsion system 124. In other embodiments, communications module 120 may be configured to receive images (e.g., still images or video images) captured from imaging system 140 and relay the images to controller 112 and/or mobile structure 130. In some embodiments, communications module 120 may be configured to support spread spectrum transmissions, for example, and/or multiple simultaneous communications channels between elements of system 100.

In some embodiments, camera mount 122 may be implemented as an actuated gimbal mount, for example, that may be controlled by controller 112 to stabilize imaging system 140 relative to a target or to aim imaging system 140 according to a desired direction and/or relative position. As such, camera mount 122 may be configured to provide a relative orientation of image capture components 142 (e.g., relative to an orientation of flight platform 110) to controller 112 and/or communications module 120. In other embodiments, camera mount 122 may be implemented as a fixed mount. In various embodiments, camera mount 122 may be configured to provide power, support wired communications, provide a shutter, and/or otherwise facilitate flight operation of imaging system 140. In further embodiments, camera mount 122 may be configured to couple to a laser pointer, range finder, and/or other device, for example, to support, stabilize, power, and/or aim multiple devices (e.g., imaging system 140 and one or more other devices) substantially simultaneously.

Propulsion system 124 may be implemented as one or more propellers, turbines, or other thrust-based propulsion systems, and/or other types of propulsion systems that can be used to provide motive force and/or lift to flight platform 110 and/or to steer flight platform 110. In some embodiments, propulsion system 124 may include multiple propellers (e.g., a tri, quad, hex, oct, or other type "copter") that can be controlled (e.g., by controller 112) to provide lift and motion for flight platform 110 and to provide an orientation for flight platform 110. In other embodiments, propulsion system 110 may be configured primarily to provide thrust while other structures of flight platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices used to provide additional environmental information of flight platform 110, for example. In some embodiments, other modules 126 may include a humidity sensor, a wind and/or water temperature sensor, a barometer, an altimeter, a radar system, a visible spectrum camera, an additional imaging system 140 (with an additional mount), an infrared camera, an irradiance detector, an ozone sensor, a carbon monoxide and/or dioxide sensor, a nephelometer, a HDR imaging device, and/or other environmental sensors providing measurements and/or other sensor signals that can be displayed to a user and/or used by other devices of system 100 (e.g., controller 112) to provide operational control of flight platform 110 and/or system 100 or to process imagery to compensate for environmental conditions, such as water content in the atmosphere between imaging system 140 and a target, for example. In some embodiments, other modules 126 may include one or more actuated and/or articulated devices (e.g., multi-spectrum active illuminators, visible and/or IR cameras, radars, sonars, and/or other actuated devices) coupled to flight platform 110, where each actuated device includes one or more actuators adapted to adjust an orientation of the device, relative to flight platform 110, in response to one or more control signals (e.g., provided by controller 112).

The object detection and analysis system 180 analyzes images captured from the imaging system 140 to detect objects, identify and/or classify objects, and/or communicate data (including captured images) to the mobile structure 130. The object detection and analysis system 180 includes an image processor 182, a memory 183, communications modules 192, and a data analytics engine 184. The data analytics engine 184 may further include data acquisition modules 186 to receive data generated by the UAS 102 (e.g., from one or more sensors), an object detection system 188 and an object identification system 190. The data acquisition modules 186 may include modules for acquiring image data, sensor data, GPS location, date and time, and other data associated with the UAS 102. The object detection system 188 may include an MVA for analyzing captured images for the presence of desired objects. The object identification system 190 may include a neural network trained to receive image data from the object detection system 188, and/or data from data acquisition modules 186, and output an object classification and/or confidence level (e.g., a probability) of the identified object being at the identified location.

User interface 132 of mobile structure 130 may be implemented as one or more of a display, a touch screen, a keyboard, a mouse; a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 136 of mobile structure 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of flight platform 110, location and classification of detected objects, and/or other elements of system 100. For example, user interface 132 may be adapted to display a time series of positions, headings, and/or orientations of flight platform 110 and/or other elements of system 100 overlaid on a geographical map, which may include one or more graphs indicating a corresponding time series of actuator control signals, sensor information, and/or other sensor and/or control signals. In another example, recorded data from the UAS 102 and sonar system 166 of the mobile structure 130, for example, can be combined, searched, filtered, analyzed, and combined with external data to provide reporting and recommendations for future fish locations. This data/recommendation can be displayed as a report or as a layer that is overlaid on cartographic, sonar or navigation data.

In some embodiments, user interface 132 may be adapted to accept user input including a user-defined target heading, waypoint, route, desired object for detection, and/or orientation for an element of system 100, for example, and to generate control signals to cause flight platform 110 to move according to the target heading, route, and/or orientation. In other embodiments, user interface 132 may be adapted to accept user input modifying a control loop parameter of controller 112 and/or 138, for example.

In further embodiments, user interface 132 may be adapted to accept user input including a user-defined target object and search area for a marine object search. The user interface 132 may be further adapted to accept user input configuring an attitude, orientation, and/or position for an actuated device (e.g., imaging system 140) associated with flight platform 110, for example, and to generate control signals for adjusting an orientation and/or position of the actuated device according to the target attitude, orientation, and/or position. Such control signals may be transmitted to controller 112 (e.g., using communications modules 154, 144 and 120), which may then control flight platform 110 and/or imaging system 140, accordingly.

Communications module 154 may be implemented as any wired and/or wireless communications module configured to transmit and receive analog and/or digital signals between elements of system 100. For example, communications module 154 may be configured to transmit flight control signals from user interface 132 to communications module 120 or 144. In other embodiments, communications module 154 may be configured to receive captured image data (e.g., still images or video images) from imaging system 140 and/or object detection and identification results and related data from data analytics engine 184, through communications module 192. In some embodiments, communications module 154 may be configured to support spread spectrum transmissions, for example, and/or multiple simultaneous communications channels between elements of system 100.

In certain embodiments; mobile structure 130 may include navigational sensors such as a sonar system 166, a steering sensor/actuator 160, an orientation sensor 168, a speed sensor 162, a gyroscope/accelerometer 164, a global navigation satellite system (GNSS) 162, and/or other modules 138 (i.e., a radar system, other ranging sensors, various environmental sensors, sensors directed towards the dynamic characteristics of the mobile structure, and/or other sensors). Other modules 138 may include other and/or additional sensors, actuators, communications modules/nodes, and/or user interface devices used to provide additional environmental information of mobile structure 130, for example. In some embodiments, other modules 138 may include a humidity sensor, a wind and/or water temperature sensor, a barometer, a radar system, a visible spectrum camera, an infrared camera, lidar systems, a salinity sensor such as a sea surface salinity sensor, and/or other environmental sensors providing measurements and/or other sensor signals that can be displayed to a user and/or used by other devices of system 100 (e.g., controller 112 and/or 138) to provide operational control of mobile structure 130 and/or system 100 that compensates for environmental conditions, such as wind speed and/or direction, swell speed, amplitude, and/or direction, and/or an object in a path of mobile structure 130, for example. In some embodiments, other modules 138 may include one or more actuated devices (e.g., spotlights, infrared and/or visible light illuminators, infrared and/or visible light cameras, radars, sonars, lidar systems, and/or other actuated devices) coupled to mobile structure 130, where each actuated device includes one or more actuators adapted to adjust an orientation of the device, relative to mobile structure 130, in response to one or more control signals (e.g., provided by controller 112 and/or 138). Additionally, other modules 138 may also include orientation and/or position sensors associated with sensors of the other modules 138. The orientation and/or position sensors may be incorporated within the sensors of the other modules 138 or may be separate from the sensors of the other modules 138.

Image capture components 142 of imaging system 140 may be implemented as a sensor array adapted to detect visible light images received through an optical assembly. In another embodiment, the image capture components 142 may be implemented as a cooled and/or uncooled array of detector elements, such as quantum well infrared photodetector elements, bolometer or microbolometer based detector elements, type II superlattice based detector elements, and/or other infrared spectrum detector elements that can be arranged in a focal plane array. Image capture components 142 may include one or more logic devices (e.g., similar to controller 112 and/or 138) that can be configured to process imagery captured by sensors/detector elements of imaging capture components 142 before providing the imagery to memory 146 or communications module 144. More generally, imaging module 142 may be configured to perform any of the operations or methods described herein, at least in part, or in combination with controller 112 and/or 138 and/or user interface 132.

In some embodiments, imaging system 140 may be implemented with a second or additional imaging modules similar to imaging capture components 142, for example, that may be include detector elements configured to detect other spectrums, such as visible light, infrared, ultraviolet, and/or other spectrums or subsets of spectrums. In various embodiments, such additional imaging modules may be calibrated or registered to image capture components 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view. The object detection and analysis system 180 may be adapted to detect and classify objects in one or more of the images captured from one or more of the imagine modules. For example, in one embodiment analysis of infrared images may be used to detect objects on the surface of the body of water, while analysis of visible spectrum images may be used to detect objects that are underwater.

Communications module 144 of imaging system 140 may be implemented as any wired and/or wireless communications module configured to transmit and receive analog and/or digital signals between elements of system 100. For example, communications module 144 may be configured to transmit captured images from image capture components 142 to communications module 120, 154 or 192. In other embodiments, communications module 144 may be configured to receive control signals (e.g., control signals directing capture, focus, selective filtering, and/or other operation of imaging system 140) from controller 112 and/or 138 and/or user interface 132. In some embodiments, communications module 144 may be configured to support spread spectrum transmissions, for example, and/or multiple simultaneous communications channels between elements of system 100.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of imaging system 140 may be implemented similar to orientation sensor 114 or gyroscope/accelerometer 116, and/or another device capable of measuring an orientation of imaging system 140 and/or image capture components 142 (e.g., magnitude and direction of roll, pitch, and/or yaw, relative to one or more reference orientations such as gravity and/or Magnetic North) and providing such measurements as sensor signals that may be communicated to various devices of system 100. GNSS 150 of imaging system 140 may be implemented according to any global navigation satellite system, including a GPS, GLONASS, and/or Galileo based receiver and/or other device capable of determining absolute and/or relative position of imaging system 140 (e.g., or an element of imaging system 140) based on wireless signals received from space-born and/or terrestrial sources, for example, and capable of providing such measurements as sensor signals that may be communicated to various devices of system 100.

Other modules 152 of imaging system 140 may include other and/or additional sensors, actuators, communications modules/nodes, cooled or uncooled optical filters, and/or user interface devices used to provide additional environmental information associated with imaging system 140, for example. In some embodiments, other modules 152 may include a humidity sensor, a wind and/or water temperature sensor, a barometer, a radar system, a visible spectrum camera, an infrared camera, a GNSS, a nepholometer, an ozone sensor, a carbon monoxide and/or dioxide sensor, a HDR imaging device, and/or other environmental sensors providing measurements and/or other sensor signals that can be displayed to a user and/or used by image capture components 142 or other devices of system 100 (e.g., controller 112 and/or 138) to provide operational control of flight platform 110 and/or system 100 or to process captured imagery to compensate for environmental conditions, such as an water content in the atmosphere approximately at the same altitude and/or within the same area as imaging system 140, for example.

Referring back to mobile structure 130, sonar system 166 may be configured to image a body of water and/or a seafloor located nearby the mobile structure 130. Sonar system 166 may detect objects within the body of water and/or the seafloor. Sonar system 166 may output or provide sonar data to controller 112 and/or 134.

Orientation sensor 168 may be implemented as one or more of a compass, float, accelerometer, and/or other device capable of measuring an orientation of mobile structure 130 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 164 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 130 and providing such measurements as sensor signals that may be communicated to other devices of system 100.

Steering sensor/actuator 160 may be adapted to physically adjust a heading of mobile structure 130 according to one or more control signals, user inputs, and/or stabilized attitude estimates provided by a controller of system 100, such as controller 134. Steering sensor/actuator 160 may include one or more actuators and control surfaces (e.g., a rudder or other type of steering or trim mechanism) of mobile structure 130 and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 130. In some embodiments, propulsion system 170 may be non-articulated, for example, such that the direction of motive force and/or thrust generated by propulsion system 170 is fixed relative to a coordinate frame of mobile structure 130. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 160, for example, such that the direction of generated motive force and/or thrust is variable relative to a coordinate frame of mobile structure 130. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Mobile structure 130 may additionally include flight platform receiver 194. Flight platform receiver 194 may be configured to interface with flight platform HO. In certain embodiments, flight platform receiver 194 may be a landing pad, a charger, a docking station, and/or other such area and/or structure that may allow for flight platform 110 to interface with, charge, transfer data, and/or otherwise dock with mobile structure 130.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for flight platform 110, using one or more power leads. Such power leads may also be used to support one or more communication techniques between elements of system 100.

Figure 1E:
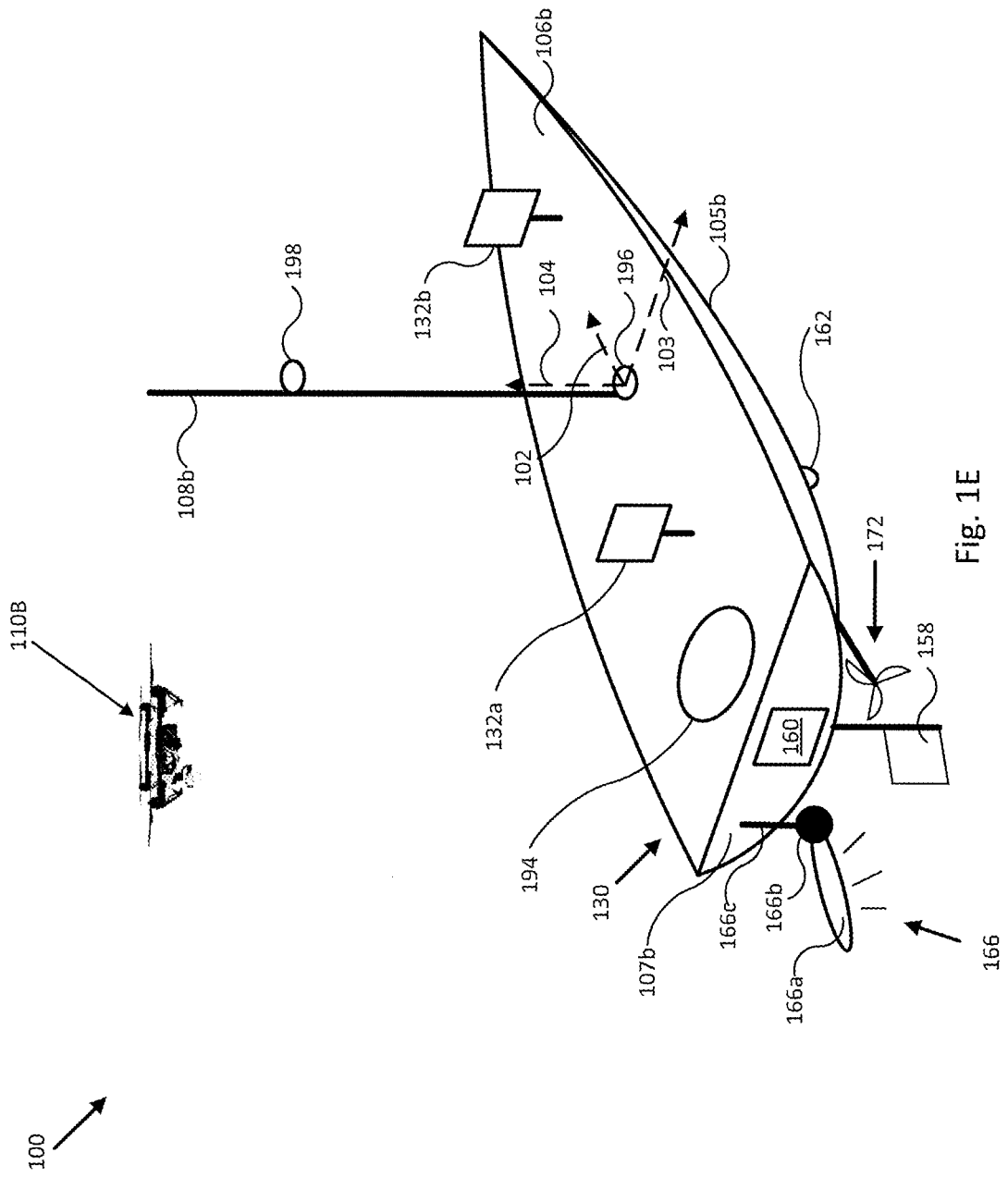
FIG. 1E illustrates a mobile structure with an unmanned aerial system in accordance with one or more embodiments of the disclosure.

FIG. 1E illustrates a mobile structure with an unmanned aerial system in accordance with an embodiment of the disclosure. In the embodiment shown in FIG. 1E, system 100 may be implemented to provide navigational data, such as an integrated model or some data outputs to the user, for use with operation of mobile structure 130. For example, system 100 may include sonar system 166, integrated user interface/controller 132a and/or 132b, steering sensor/actuator 160, sensor cluster 196 (e.g., orientation sensor 168, gyroscope/accelerometer 164, GNSS 162, and/or other modules 138 such as radar systems), imager cluster 198, and various other sensors and/or actuators. In the embodiment illustrated by FIG. 1E, mobile structure 130 is implemented as a motorized boat including a hull 105b, a deck 106b, a transom 107b, a mast/sensor mount 108b, a rudder 158, an inboard motor 172, and an actuated sonar system 166 coupled to transom 107b. In other embodiments, hull 105b, deck 106b, mast/sensor mount 108b, rudder 158, inboard motor 172, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1E, mobile structure 130 includes actuated sonar system 166, which in turn includes transducer assembly 166a coupled to transom 107b of mobile structure 101 through assembly bracket/actuator 166b and transom bracket/electrical conduit 166c. In some embodiments, assembly bracket/actuator 166b may be implemented as a roll, pitch, and/or yaw actuator, for example, and may be adapted to adjust an orientation of transducer assembly 166a according to control signals and/or an orientation (e.g., roll, pitch, and/or yaw) or position of mobile structure 130 provided by user interface/controller 132a and/or 132b. For example, user interface/controller 132a and/or 132b may be adapted to receive an orientation of transducer assembly 166a configured to ensonify a portion of surrounding water and/or a direction referenced to an absolute coordinate frame, and to adjust an orientation of transducer assembly 166a to retain ensonification of the position and/or direction in response to motion of mobile structure 130, using one or more orientations and/or positions of mobile structure 130 and/or other sensor information derived by executing various methods described herein.

In another embodiment, user interface/controller 132a and 132b may be configured to adjust an orientation of transducer assembly 166a to direct sonar transmissions from transducer assembly 166a substantially downwards and/or along an underwater track during motion of mobile structure 130. In such embodiment, the underwater track may be predetermined, for example, or may be determined based on criteria parameters, such as a minimum allowable depth, a maximum ensonified depth, a bathymetric route, and/or other criteria parameters. Transducer assembly 166a may be implemented with a sonar orientation and/or position sensor (OPS), which may include one or more sensors corresponding to orientation sensor 168, gyroscope/accelerometer 164, and/or GNSS 162, for example, that is configured to provide absolute and/or relative positions and/or orientations of transducer assembly 166a to facilitate actuated orientation of transducer assembly 166a.

In one embodiment, user interfaces 132a/b may be mounted to mobile structure 130 substantially on deck 106b and/or mast/sensor mount 108b. Such mounts may be fixed, for example, or may include gimbals and other leveling mechanisms/actuators so that a display of user interfaces 132a/b can stay substantially level with respect to a horizon and/or a "down" vector (e.g., to mimic typical user head motion/orientation), for example, or so the display can be oriented according to a user's desired view. In another embodiment, at least one of user interfaces 132a/b may be located in proximity to mobile structure 130 and be mobile/portable throughout a user level (e.g., deck 106b) of mobile structure 130. For example, a secondary user interface may be implemented with a lanyard, strap, headband, and/or other type of user attachment device and be physically coupled to a user of mobile structure 130 so as to be in proximity to the user and mobile structure 130. Other embodiments of the user interface may include a portable device that is not physically coupled to the user and/or mobile structure 130. In various embodiments, user interface 132a/b may be implemented with a relatively thin display that is integrated into a PCB or other electronics of the corresponding device or structure in order to reduce size, weight, housing complexity, and/or manufacturing costs.

As shown in FIG. 1E, in some embodiments, speed sensor 162 may be mounted to a portion of mobile structure 130, such as to hull 105b, and be adapted to measure a relative water speed. In some embodiments, speed sensor 162 may be adapted to provide a thin profile to reduce and/or avoid water drag. In various embodiments, speed sensor 162 may be mounted to a portion of mobile structure 130 that is substantially outside easy operational accessibility. Speed sensor 162 may include one or more batteries and/or other electrical power storage devices, for example, and may include one or more water-powered turbines to generate electrical power. In other embodiments, speed sensor 162 may be powered by a power source for mobile structure 130, for example, using one or more power leads penetrating hull 105b. In alternative embodiments, speed sensor 162 may be implemented as a wind velocity sensor, for example, and may be mounted to mast/sensor mount 108b to have relatively clear access to local wind.

In the embodiment illustrated by FIG. 1E, mobile structure 130 may include direction/longitudinal axis 102, direction/lateral axis 103, and direction/vertical axis 104 meeting approximately at mast/sensor mount 108b (e.g., near a center of gravity of mobile structure 130). In one embodiment, the various axes may define a coordinate frame of mobile structure 101 and/or sensor cluster 196. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100 and/or mobile structure 130.

Each element of system 100 may be located at positions different from those depicted in FIG. 1E. Each device of system 100 may include one or more batteries or other electrical power storage devices, for example, and may include one or more solar cells or other electrical power generating devices. In some embodiments, one or more of the devices may be powered by a power source for mobile structure 130. As noted herein, each element of system 100 may be implemented with an antenna, a logic device, and/or other analog and/or digital components enabling that element to provide, receive, and process sensor signals and interface or communicate with one or more devices of system 100. Further, a logic device of that element may be adapted to perform any of the methods described herein.

FIG. 1E also includes a flight apparatus 110B. Flight apparatus 110B may include, for example, one or more of flight platform 110, imaging system 140, and/or object detection and identification engine 180, of FIG. 1D. Flight apparatus 110B may include some or all equipment that may be locally present as a part of or to operate flight platform 110, imaging system 140 and/or object detection and identification engine 140. Additionally, flight apparatus 110B may include equipment configured to receive instructions from mobile structure 130.

Mobile structure 130 may include a flight platform receiver 194. The flight platform receiver 194 may be a landing platform and/or area, docking station, charger, coupling, and/or other apparatus that may allow flight apparatus 110B to land, park, receive power (e.g., electrical charge and/or fuel) from, transfer data, and/or perform other such actions interfacing flight apparatus 110B with mobile structure 130. In certain embodiments, flight platform receiver 194 may include one or more features that may be configured to interface and/or engage with corresponding features on flight apparatus 110B. In certain such embodiments, such features may be required to interface and/or engage before data and/or power is transferred between the mobile structure 130 and the flight apparatus 110B. Additionally, such features may only be engaged if flight apparatus 110B is in a specific orientation relative to flight platform receiver 194.

Figure 2:
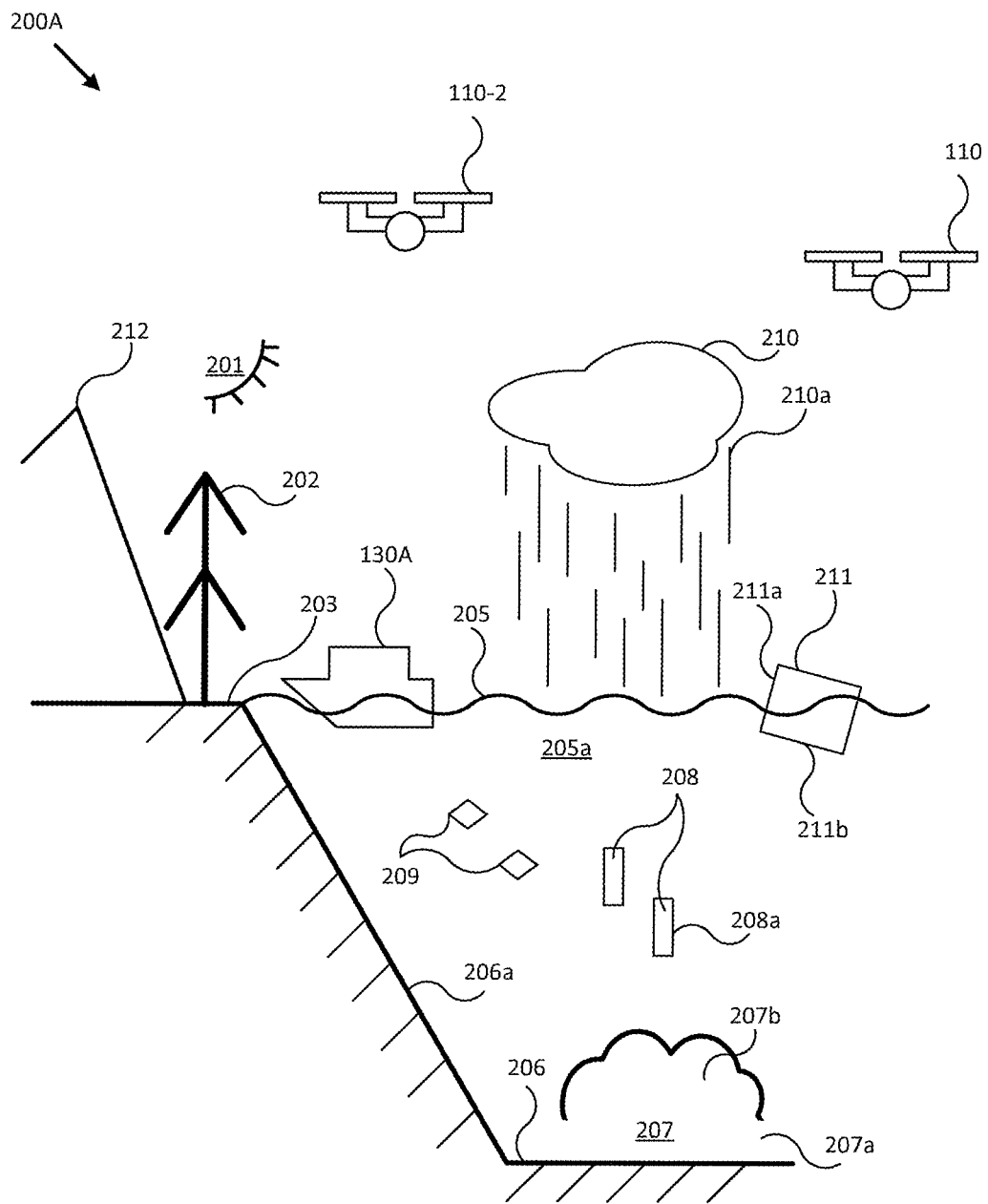
FIG. 2 illustrates a representation of an environment with a mobile structure and an unmanned aerial system in accordance with one or more embodiments of the disclosure.

FIG. 2 illustrates a representation of an environment with a mobile structure and an unmanned aerial system in accordance with an embodiment of the disclosure. FIG. 2 may include a mobile structure 130A and a UAS 110. One or more imaging modules and/or sensors coupled to UAS HO and/or mobile structure 130A may image and/or sense a surface of a body of water 205a and various objects or structures above waterline 205, such as the sun 201, a tree 202, a beach 203, a hill 212, cloud 210, rain 210a, and/or floating object 211 or floating object 211a (the part of the floating object 211 above the waterline). Such imaging modules and/or sensors may output or otherwise provide data associated with such objects. Such objects may be detected via, for example, thermal imaging, visual imaging, radar detection, and/or detection through other modules of UAS 110 and/or mobile structure 130A. Additionally, one or more imaging modules, and/or sensors (e.g., sonar sensors) coupled to UAS 110 and/or mobile structure 130A may image and/or sense various objects and/or structures below 205, such as a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a.

Such data may be processed using image processing techniques, object detection techniques, and/or other feature/pattern recognition techniques. For example, such techniques may be used to determine a location of waterline 205 within image data. Sonar data, which may be provided by bathymetric charts and/or past or current use of the sonar system and/or a sonar system coupled to UAS 110, may include data representative of waterline 205, a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a. Imaging system 140 of UAS 110 may determine a water temperature (e.g., using an infrared camera) and may, for example, determine, via data from an infrared camera indicating changes in water temperature of portions of the body water over time, currents and/or changes in water temperature.

Such data may be outputted or provided to an object detection system 188, controllers 112 and/or 138, and/or other system components to determine environmental conditions and/or create a representation of the environment. For example, controllers 112 and/or 138 may determine, from such data, ambient temperature, wind conditions, water temperature, current conditions, humidity, barometric pressure, other weather conditions (e.g., rain, cloud, fog), the presence of objects within the environment (e.g., debris, vehicles, obstacles, and/or other such items), terrain features, presence of flora and/or fauna, position of the sun, moon, and/or other celestial objects, and/or other such features and/or conditions. Such determinations may, for example, aid in the navigation of mobile structure 130A (e.g., in environments where mobile structure 130A may be piloted in shallow waters and/or rivers, current conditions and information about debris and obstacles may be used to ensure that mobile structure 130A safely navigates such shallow water areas) toward a detected and identified object location.

In certain embodiments, such determinations may be used to generate a point model and/or three-dimensional representation of the environment around mobile structure 130A. In certain other embodiments, the controller 112 and/or 138 may determine a planned and/or likely path for the mobile structure 130A and may determine the presence of environmental conditions (e.g., current conditions, weather conditions, temperature, pressure, and/or other such conditions) and/or objects (e.g., animals, debris, other vehicles, and/or other such objects) that may affect movement of the mobile structure 130A through the planned and/or likely path (e.g., affect the speed, safety, and/or likelihood that mobile structure 130A can travel over the planned and/or likely path). In certain additional embodiments, controller 112 and/or 138 may determine a fastest path for mobile structure 130a to follow from a first position to a second position, responsive to environmental conditions and/or objects detected. Also, in certain other embodiments, controller 112 and/or 138 may be configured to detect specific objects and/or terrain features. As such, for example, controller 112 and/or 138 may receive such data and determine the presence and/or absence of, for example, a person within body of water 205. In certain such embodiments, the presence of the person within body of water 205 may be determined, at least in part, via one or more thermal imaging devices coupled to UAS 110.

A sea state of the body of water 205*a* may also be determined using captured data, including image data captured from the imaging system 140. For example, as shown in FIG. 2, waterline 205 may be choppy. Analysis of the visual and/or thermal imaging data may determine the choppiness of waterline 205 and, thus, determine at least a portion of the sea state of body of water 205*a*. In certain embodiments, such a sea state (e.g., sea calmness or choppiness) may be communicated to the flight platform 110 to adjust a minimum altitude of a flight path. The sea state may also be used to provide a graphical representation (e.g., animating the sea state in a 2D or 3D manner or through representations of the sea state using sea state indicators) or textual representation (e.g., text describing the sea state or rating the sea state according to a sea state scale such as a numerical scale) for display to the user.

Data from the modules within system 200A or system 100 may be combined within a navigational database. The navigational database may, for example, be contained within memories of controller 112 and/or 138, within other memories, and/or may be communicatively connected to other components within system 100 and/or the system 200A. Such navigational database may receive data from other modules, sensors, imaging systems, or devices that may or may not be coupled with mobile structure 130 and/or UAS 110. For example, navigational database may receive data from a smartphone of a user, from other vehicles, from GNSS satellites, from fixed devices such as traffic control services, from other communications systems such as radios and laser communications, and from cloud based interior database. In certain such embodiments, communications module 120, 144, and/or 154 may transmit and/or receive navigational database and/or data associated with navigational database.

For the purposes of this disclosure, any and all data that may directly or indirectly aid in the navigation of a vehicle may be considered navigational data. Also, the navigational database may combine navigational data of navigational sensors from any or all appropriate sources. The navigational database may also include orientation and/or position data from and/or associated with the navigational sensors. In certain embodiments, the navigational database may receive data from other sensors via communications modules 120, 144, and/or 154.

Such navigational database may, in certain embodiments, be used to aid in navigation of mobile structure 130 by fusing together data from a plurality of sensors. The data may be fused in a manner to aid in the navigation of mobile structure 130 or assist in the presentation of the data to an operator of mobile structure 130 or a user of a display in a manner that may make the presentation easier to understand, more complete, and/or more informative. In certain embodiments, an operator may be a person in operational control of mobile structure 130, while a user may be a person in control of an electronic device that may contain the display. The operator and/or the user may be the same person or may be different people.

For example, the navigational database may include data from sonar system 182, infrared camera 140, imaging module 142, visible spectrum imaging modules, orientation sensor 180, radar, and/or other navigation sensors of system 200A. Controller 112 and/or 138 may be configured to generate an integrated model from at least some of the data within navigational database. Such an integrated model may be, for example, a 2D or 3D representation of an environment near mobile structure 130. The integrated model may present the environment from substantially the point of view of the viewer of the vehicle (e.g., from the point of view of a bridge of a watercraft or from the point of view of where an imaging sensor may be located), from a top down point of view, from a perspective or angled view, or from a free-form view (i.e., where a user may select a viewpoint).

In certain embodiments, the integrated model may combine data from multiple sensors into one view. Such an integrated model may include a rendering of a virtual representation of the environment (e.g., render the environment from scratch, such as with a full 3D model) or may use data from one or more sensors as a base view and render additional data "on top" of the base view, such as in an overlay with variable transparency, for instance.

For example, data from a visible spectrum imaging module may be selected for the base view and data from an infrared imaging module, a sonar system, and/or a radar may be rendered "on top" of the base view (e.g., to depict detected objects of interest to the user). In certain embodiments, one or more of such modules may be coupled to UAS 110. Accordingly, the base view may be a visual view from the visible spectrum imaging module. Due to rain 210*a*, the visible spectrum imaging module, which may be coupled to mobile structure 130A, may not be able to detect floating object 211 behind rain 210*a*. However, UAS 110 may be able to detect floating object 211. Thus, data from UAS 110 may supplement and/or be combined with data from mobile structure 130A and an integrated model may be generated with such data. In certain embodiments, the integrated model may overlay radar and/or thermal image data over visual spectrum data. Such models may be presented to a user and/or operator of the mobile via, for example, user interface 132. Accordingly, an operator/user may be aware of the presence of floating object 211 even though floating object 211 may not be visible and/or detectable by modules of mobile structure 130A.

In other embodiments, UAS 110 may detect weather conditions such as, for example, determining an intensity of rain 210*a* or any other weather feature (such as the density of any fog and/or cloud). UAS 110 may communicate data associated with weather conditions to mobile structure 130A. Such data may, for example, aid in navigation of mobile structure 130A. Also, UAS 110 and/or mobile structure 130A may determine a position of sun 201. The determined position of sun 201 may be used to aid in correction of any environmental data obtained by UAS 110 and/or mobile structure 130A. As such, for example, irradiance and/or thermal values obtained by thermal imaging modules may be modified responsive to the position of sun 201. The controller 112 and/or 138 may, for example, determine the position of the sun 201 relative to an object imaged and correct for any effect the position of the sun 201 may have on irradiance and/or thermal values obtained.

Additionally or alternatively, features detected by modules of UAS 110 and/or mobile structure 130A may be incorporated into the integrated model. For example, sonar systems of UAS 110 and/or mobile structure 130A may detect and/or output or provide data representative of waterline 205, floor 206 of body of water 205*a*, bank 206*a* of floor 206, bottom feature 207 (e.g., a rock or sunken ship), fish 208, other submerged objects 209 (e.g., trash, seaweed), floating object 211*b*, and/or other underwater features within or surrounding body of water 205*a*. Such underwater features may be rendered within the integrated model. Such underwater features may be indicated and/or differentiated within the integrated model from, for example, features above the water line through use of any combination of contour lines, color and/or greyscale mapping and/or shading, three-dimensional rendering, and/or other volumetric rendering techniques. In some embodiments, surface orientations of various underwater features (e.g., of side 207*a* or top 207*b* of bottom feature 207, or of side 208*a* of fish 208) may be detected and/or differentiated using similar sonar data and/or image processing techniques. For example, in certain such embodiments, mobile structure 130A may be a fishing vessel. UAS 110 may search for fish 208 and transit data to mobile structure 130A that may alert the operator of mobile structure 130A to the presence of fish. Additionally, orientations of fish 208 may be determined and such orientations may be factor considered for a forecast of future positions of such fish 208. As such, projected future positions of fish 208 may be communicated to an operator of mobile structure 130A to aid in catching and/or viewing fish 208. In certain such embodiments, controller 112 and/or 138 may forecast future positions at a plurality of time points, determine time required for mobile structure 130A to reach such positions, and suggest a path, orientation, velocity, and/or other pilot factorings to meet such fish 208.

The mobile structure 130 may be associated with a plurality of UASs, such as UAS 110 and UAS 110-2. Each of the plurality of UASs may, for example, be stored and/or maintained on mobile structure 130. Mobile structure 130 may launch one or more of UASs at any point in time to, for example, search for desired objects, aid in navigation, aid in route planning and/or other tasks performed by mobile structure 130. Mobile structure 130 may simultaneously receive data from a plurality of UASs. Additionally, mobile structure 130 may provide instructions to one or more of the plurality of UASs. In certain embodiments, mobile structure 130 may include one or a plurality of flight platform receivers 194. Some embodiments may, for example, user a plurality of UASs to detect the presence of objects of interest (e.g., fish, or a person in a search and rescue operation) and select a position responsive to such determinations as well as perform other determinations to increase the quality of the captured images.

Figure 3:
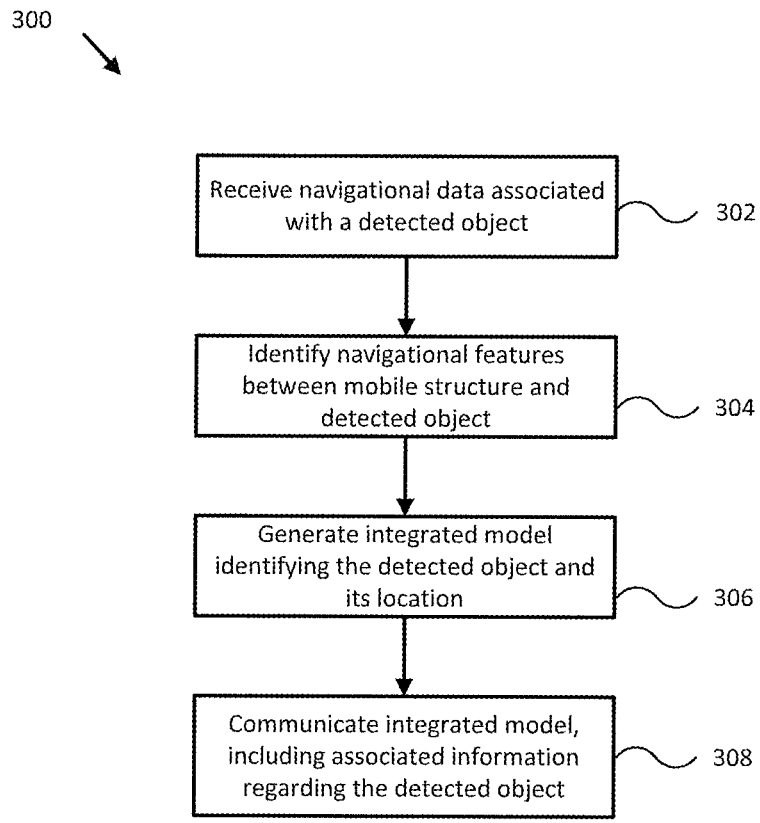
FIG. 3 illustrates a flow diagram detailing communication of a detected object in accordance with one or more embodiments of the disclosure.

FIG. 3 illustrates a flow diagram detailing example communication of a detected object in accordance with one or more embodiments of the disclosure. The process illustrated in FIG. 3 may be performed by, for example, one or more controllers such as controller 112 and/or 138 of flight platform 110 and/or mobile structure 130.

In block 302, navigational data associated with a detected and identified object may be received from, for example, one or more UASs. The navigational data may include data associated with an environment around the mobile structure and/or detected object, including weather data, sonar data, radar data, temperature data, visual imaging data, and/or other such data. Navigational data from the one or more UASs may be received by the mobile structure wirelessly (e.g., via a WiFi, optical, BlueTooth, 2G, 3G, 4G, WLAN, IEEE standards, LTE, Personal Area Network, ZigBee, Wireless USB, and/or other such wireless data connections), through wires, and/or through couplings (e.g., data couplings within the UAS and, for example, a flight platform receiver 190).

In block 304, navigational features between the mobile structure and the detected object may be identified from the navigational data. Navigational features may be any feature within the environment that may affect the piloting of the mobile structure and/or performance of a task by the mobile structure. For example, other mobile structures, obstacles (e.g., rocks, embankments, barriers, buoys, structures, and/or other obstacles), wildlife, people, environmental conditions, terrain features, and/or other features may be identified.

In block 306, an integrated model may be generated identifying the detected object and its location. In certain such embodiments, the integrated model may be a representation of the detected object and location and/or the environment around the mobile structure such as a three-dimensional representation, a two-dimensional representation, text communicating features, an overlay, and/or other such representations.

In block 308, the integrated model, including associated information regarding the detected object (e.g., classification, location) may be communicated to an operator and/or user. The integrated model may be communicated by, for example, a graphical representation, an audio message, a message to a secondary device, and/or other such techniques.

Figure 4:
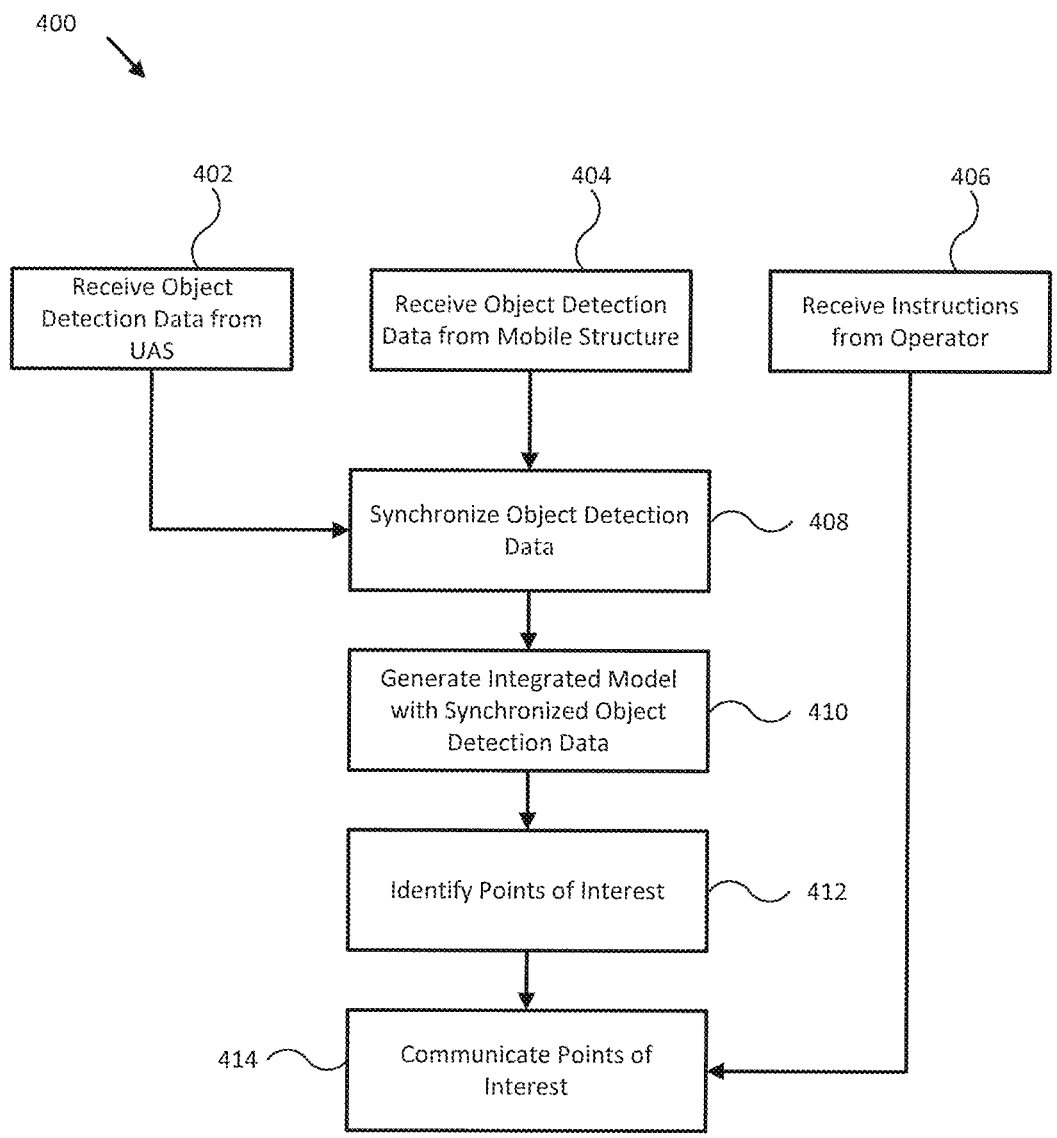
FIG. 4 illustrates a flow diagram of identifying and communicating points of interests using sensors of a mobile structure and an unmanned aerial system in accordance with one or more embodiments of the disclosure.

FIG. 4 illustrates a flow diagram of identifying and communicating objects of interests using sensors of a mobile structure and an unmanned aerial system in accordance with an embodiment of the disclosure.

In block 402, object detection data may be received from one or more UASs. Object detection data may be received in block 402 in a similar manner to that described in block 302 of FIG. 3. In block 404, object detection data may be received from the mobile structure. Object detection data may include, for example, visual image data, thermal image data, radar data, sonar data, and/or other such data acquired by one or more modules of the UAS and/or mobile structure.

In block 408, object detection data from the one or more UASs and/or from the mobile structure may be synchronized. For example, each of the one or more UASs and the mobile structure may, for example, acquire data for objects above and/or below the waterline. Such objects may include, for example, desired objects such as fish, and obstacles such as rocks within the vicinity of the mobile structure. In some operations, the one or more UASs may detect, via thermal image data, the presence of a person within the water who is not in the line of sight from the mobile structure. Data from the UAS and the mobile structure may be synchronized by, for example, matching the locations of objects detected by the UAS to locations of the same objects detected by the mobile structure. The location of the detected object (e.g., fish) relative to the mobile structure may then be determined from the synchronized data.

In block 410, an integrated model may be generated with the synchronized object detection data. As such, for an integrated model that is a three-dimensional representation of the surrounding environment, the integrated model may display only one representation for each detected object. In certain embodiments, such as embodiments where only one of the UAS and/or the mobile structure includes data detecting an item within the environment, the integrated model may still generate a representation of such items.

In block 412, points of interest may be identified and/or communicated. The points of interest may be visually identified, verbally identified, and/or identified through another technique. For example, in a visual integrated model, the point of interest may be highlighted, may be pointed out (e.g., via an arrow pointing towards it), and/or may be highlighted through another technique. In the example above, the location of the detected object may be highlighted within the integrated model. In block 414, the identified points of interest may be communicated via, for example, user interface 132 through highlights on an integrated model and/or other such techniques.

In block 406, instructions from the operator may be received. Such instructions may be received responsive to, for example, outputs from the integrated model. Instructions may include, as illustrative examples, instructions to travel to a location of the detected object, instructions to launch one or more UASs (e.g., to investigate a location), instructions to transmit information to a third party (e.g., transmit a distress signal to the Coast Guard), and/or other such instructions. In certain embodiments, one or more UASs may relay such instructions to another entity (e.g., one or more UASs may receive instructions from the mobile structure and transmit such instructions to a network system). As such, the one or more UASs may improve transmission ranges of the mobile structure, such as when line of sight obstructions and/or other potential transmission impediments are present.

In a search and rescue example, instructions may be received to communicate the presence of a detected person to the Coast Guard. The UAS may receive the instructions from the mobile structure and transmit it to the Coast Guard. Rescue operations may then be accordingly scheduled. More generally, one or more UASs may be configured to send or receive instructions and/or sensor information to a shore base or Coast Guard installation or ship through mobile structure 101, in order to leverage the stronger transmission power typically provided by mobile structure 101.

Figure 5:
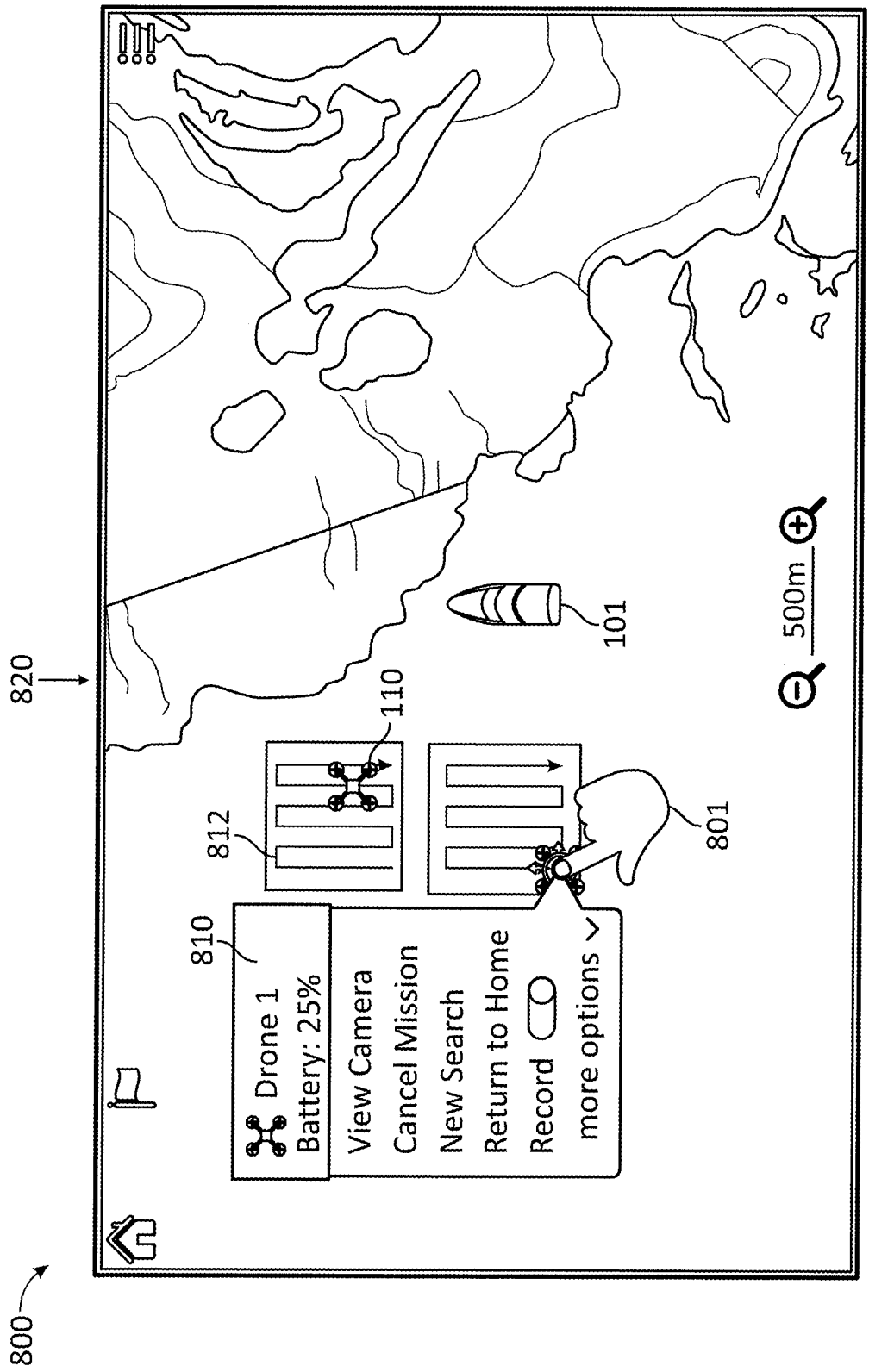
FIG. 5 illustrates a display view to facilitate search operations using a mobile structure and an associated unmanned aerial system in accordance with one or more embodiments of the disclosure.
Figure 6:
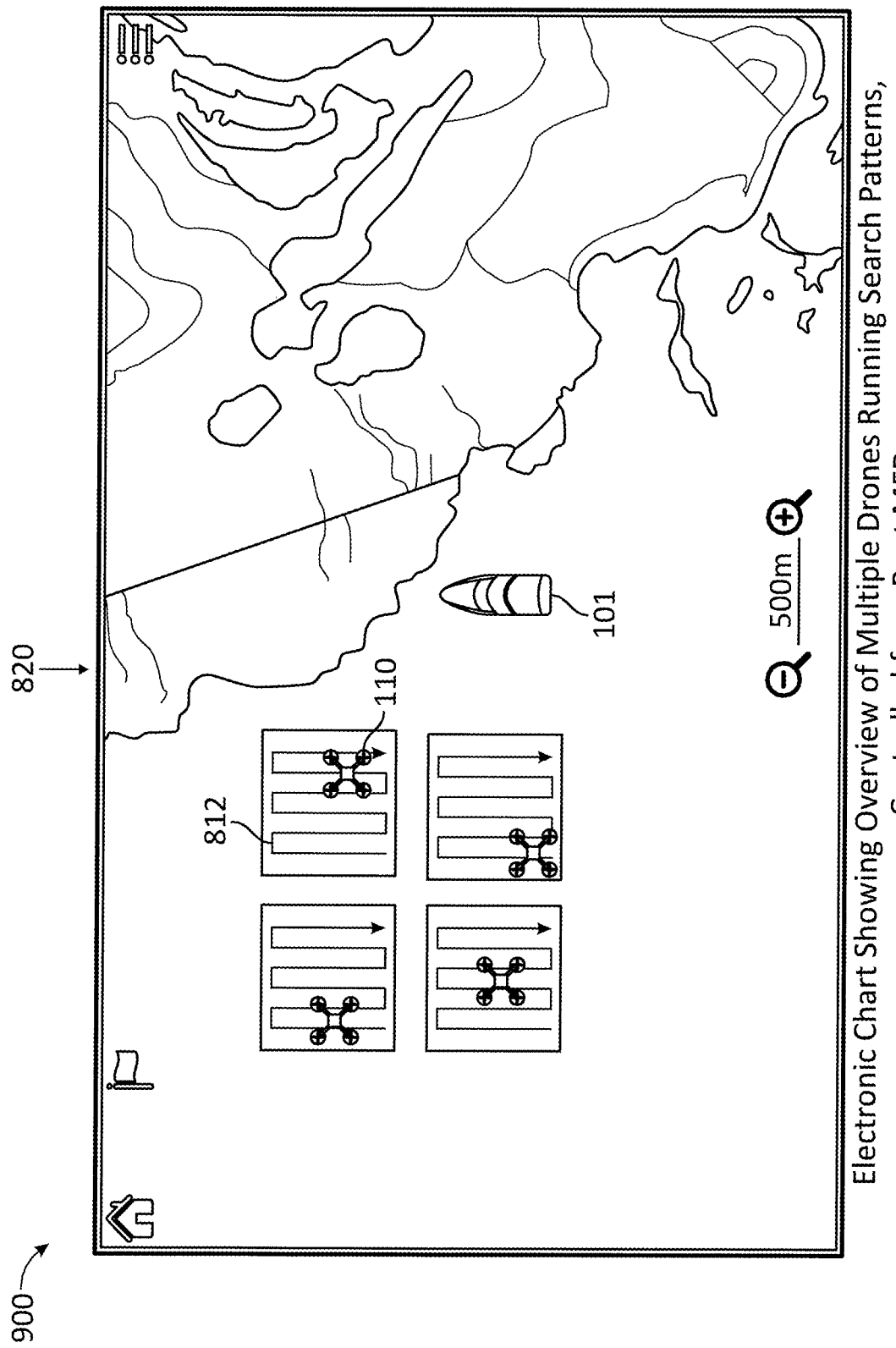
FIG. 6 illustrates a display view to facilitate search operations using a mobile structure and an associated unmanned aerial system in accordance with one or more embodiments of the disclosure.

FIGS. 5-6 illustrate display views 800 and 900 to facilitate search operations using mobile structure 101 and one or more associated UAS/flight platforms 110 in accordance with an embodiment of the disclosure. In the illustrated embodiments, the system may be configured to facilitate conducting an aerial search using one or more flight platforms 110, launched from and retrieved by mobile structure 101, and coordinating the search among the one or more flight platforms 110, according to a general search pattern or plan, and/or with additional mobile structures and/or associated UASs/flight platforms 110. For example, in some embodiments, user interface 132 and/or controller 130 may be configured to render a display view to facilitate a number of various search operations for a desired object(s), such as: creating one or multiple search patterns; transmitting such search patterns to one or more flight platforms 110; monitoring, determining/estimating, and/or displaying flight platform positions, altitudes, individual and/or aggregate search pattern completion percentages, time of/to start of a particular search pattern, time of/to completion of a particular search pattern, and/or other search operation characteristics corresponding to flight platforms participating in a particular search operation; alerting a user to a search pattern completion and presenting the option to assign and/or begin traversing another search pattern; alerting a user to potential targets detected by the one or more flight platforms; displaying imagery of such potential targets to a user; alerting a user if mobile structure 101 is maneuvered beyond a return range of a flight platform; presenting an option to pause/abort/divert a particular flight platform from an assigned search pattern to allow manual control of the flight platform; presenting one or more live imagery feeds from onboard cameras associated with the one or more flight platforms; and storing a data log of events, feeds, actions, and/or corresponding times associated with the one or more flight platforms and/or the search operations for use in post-event analysis, for example. In various embodiments, such search patterns may be defined as geostationary, for example, or may defined as positioned relative to a current/updating position and/or orientation of mobile structure 101.

In display view 800, a user is selecting a particular flight platform 110 already assigned a particular search pattern 812 (e.g., using selector 801, which may correspond to a user finger on a touch screen display, for example, or a mouse pointer or other type of graphic display selector), and user interface 132 is rendering a search operations menu 810 over a chart 820 to allow for selection of a particular search operation for the selected flight platform 110 and/or search pattern 812, as shown. Chart 810 may correspond to a satellite image and/or other navigational chart data of an area around mobile structure 101, for example, such that mobile structure 101 and relative positions of one or more search patterns 812 and corresponding flight platforms 110 may be rendered within display view 800. In display view 900, user interface 132/controller 138 is monitoring positions of flight platforms 110 and rendering display view 900 to show those positions and corresponding search patterns 812, as described herein.

In addition, search patterns created using such display views, and traversal statistics and/or video data related to such search patterns, may be transmitted to other mobile structures 101 and/or to a base located on land (e.g., for coordination of larger search operations). As such, search patterns may be received from other mobile structures 101 and/or a terrestrial base, along with associated traversal statistics, and such search patterns and traversal statistics and corresponding sensor data/video may be displayed to a user of mobile structure 101 to help coordinate search efforts. While operating under such coordination, flight platforms originally assigned to one mobile structure may be directed to land (e.g., to refuel/recharge) on a different mobile structure so as to maximize time in the air without risk of floundering. Accordingly, in some embodiments, system 100 may be configured to control its own flight platforms and other vessels' flight platforms to coordinate return commands and traffic control for its own and other search operations.

In a further example of facilitating interoperability of UAS 110 with mobile structure 101 and/or a user of mobile structure 101, in some embodiments, embodiments of imaging system 100 may be configured to facilitate maneuvering operations of one or more flight platforms 110. For example, in some embodiments, user interface 132 and/or controller 138 may be configured to render a display view including a chart with overlays indicating a position, task, heading, and/or other maneuvering characteristics of flight platform 110, and in particular, relative to a position and/or other operational state of mobile structure 101. In various embodiments, user interface 132 and/or controller 138 may be configured to render a display view of a navigational chart where: the chart is centered on a particular flight platform 110 (e.g., not mobile structure 101), and the chart orientation is selected to follow a chart orientation render mode associated with mobile structure 101 (e.g., north-up—an absolute chart orientation; heading-up—a relative chart orientation tied to the current orientation of mobile structure 101; course-up—a relative chart orientation tied to the current position of mobile structure 101 and a corresponding route leg indicating a selected course for mobile structure 101); the chart is automatically ranged/scaled to keep mobile structure 101 and flight platform 110 visible within a single continuous chart/display view; the chart includes a line of sight indicator linking the positions of mobile structure 101 and a selected flight platform 110, so that a user viewing the display view can intuitively identify where flight platform 110 is relative to mobile structure 101, or where mobile structure 101 is relative to flight platform 110 (e.g., when viewing imagery provided by flight platform 110); the chart includes a flight platform heading vector (e.g., a COG vector, configured to indicate direction and speed of flight platform 110 and/or a field of view of a camera mounted to flight platform 110) for each flight platform 110 in the display view; the chart includes a camera view vector or cone configured to indicate a direction and/or field of view of a camera mounted to flight platform 110 and, optionally, a speed of flight platform 110, for each flight platform 110 in the display view; the display view may be configured to render a split view include the chart and camera feeds from platform 110; and the chart includes a range ring centered on mobile structure 101 or flight platform 110 to indicate a relationship between the current position of mobile structure 101 and/or flight platform 110 and a flight range of flight platform 110 (e.g. max or remaining flying time, typically dictated by remaining battery capacity and/or various environmental conditions).

For example, user interface 132, controller 138, and/or controller 112 may be configured to monitor a position and a remaining battery capacity of flight platform 110 and a position and speed of mobile structure 101. System 100 may be configured to generate a return command for flight platform 110 based on such measurements so that flight platform 110 can return to mobile structure 110 without risk of exhausting its propulsion system (e.g., fuel or battery capacity) before being able to intercept/return to and land on mobile structure 101. System 100 may be configured to determine an interception point between flight platform 110 and mobile structure 101 based on the projected course or route of mobile structure 101 (e.g., it's anticipated position (s)), for example, and to direct flight platform 110 to fly to the determined interception point.

Figure 7:
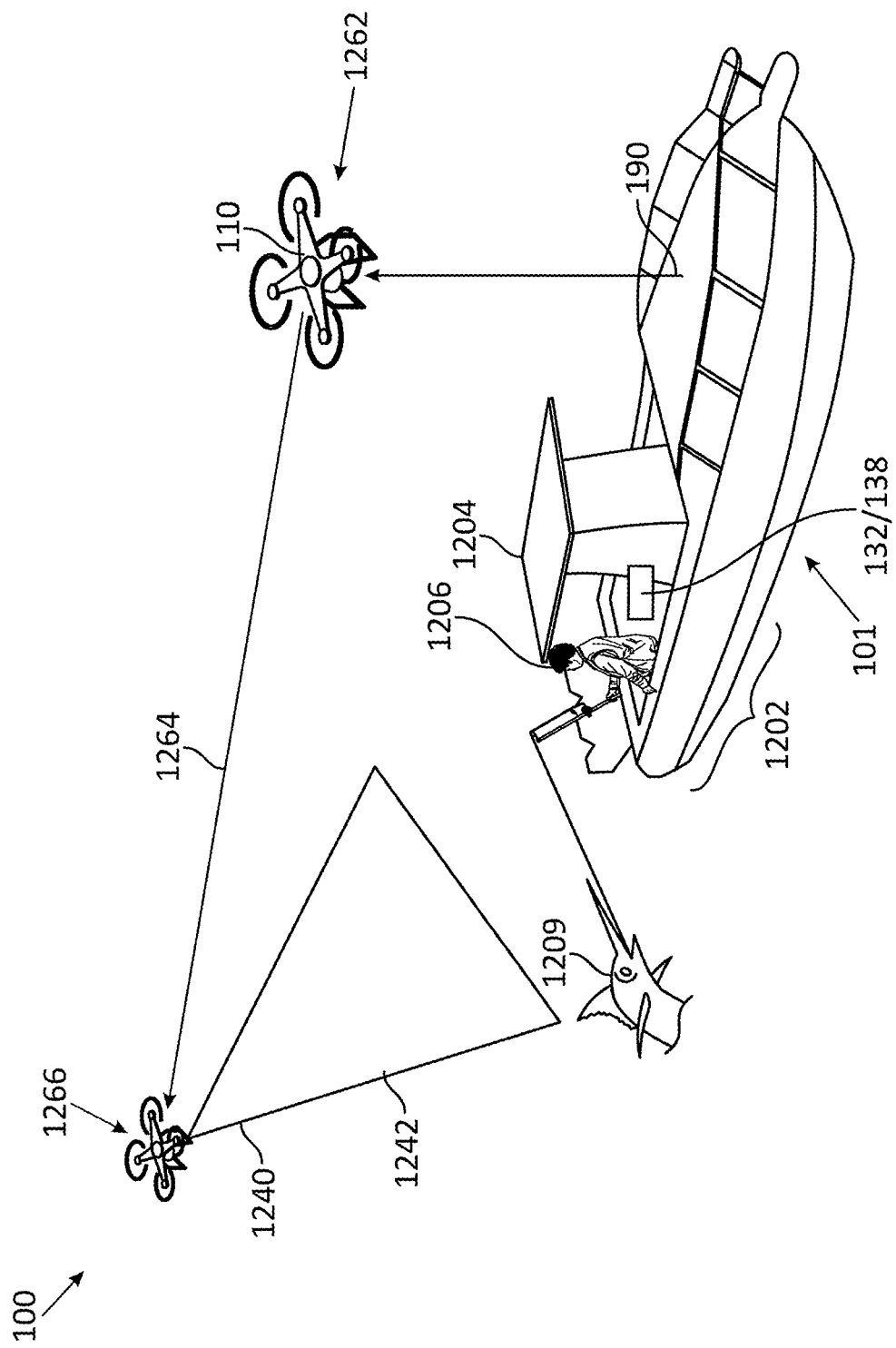
FIG. 7 illustrates a mobile structure with an associated unmanned aerial system in accordance with one or more embodiments of the disclosure.

For example, FIG. 7 illustrates mobile structure 101 with an associated UAS/flight platform 110 in accordance with an embodiment of the disclosure. User interface 132/controller 138 of system 100 may be configured to detect and track certain fish in the water and may be configured to receive user input from user 1206 indicating an action to take when a fish is located. For example, the user may launch a UAS 1240 from flight platform receiver 194 along a search path 1264. The UAS 1240 captures images of the water below and analyzes the captured data to detect and identify a desired object, such as a fish 1209 within a field of view 1242.

Figure 8:
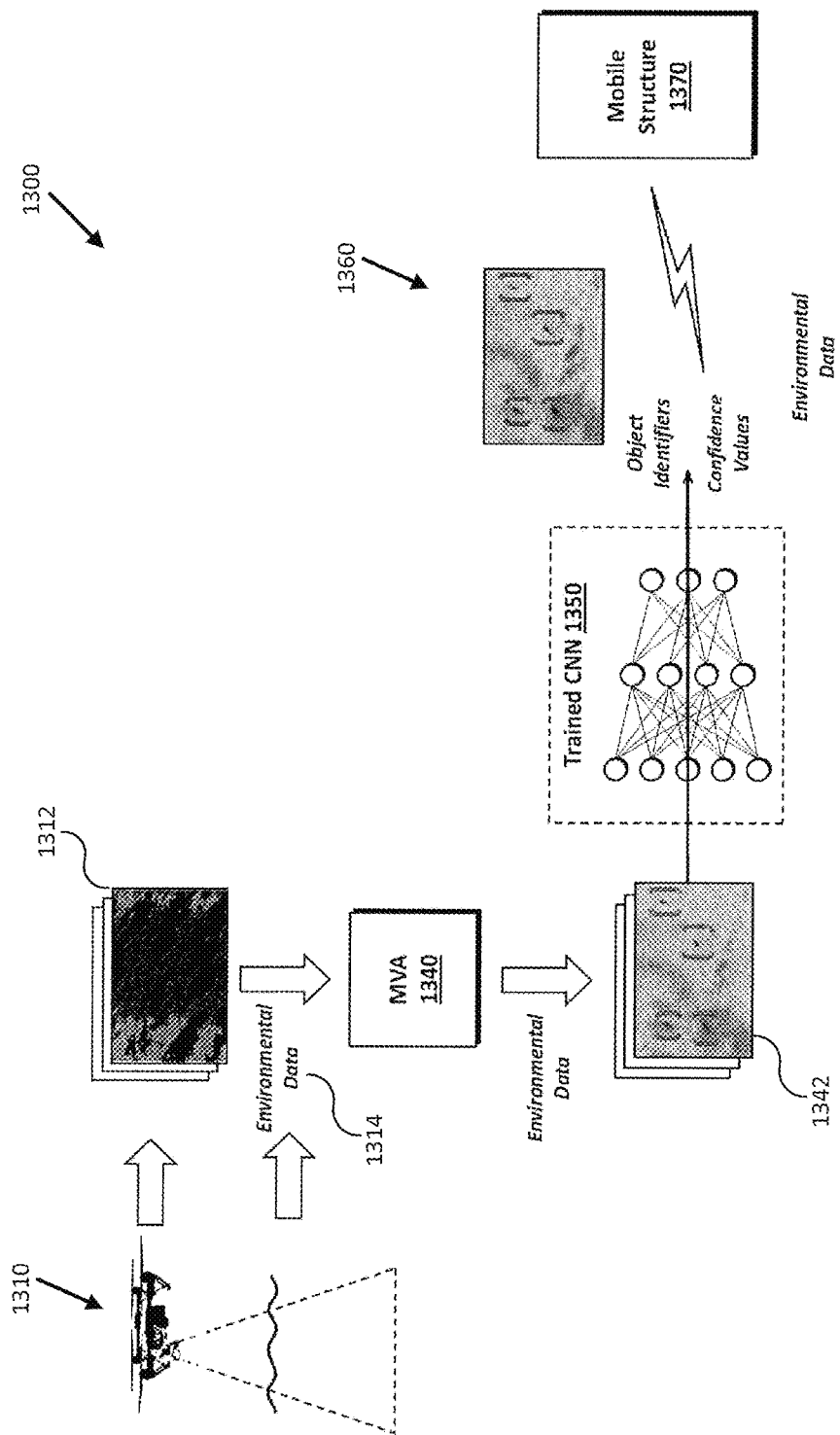
FIG. 8 illustrates an example operation of an object detection and classification system in accordance with one or more embodiments.

FIG. 8 illustrates an example operation of an object detection and classification system in accordance with one or more embodiments. A system 1300 includes an unmanned aerial system 1310, which includes a marina video analysis module 1340 and an object detection module implemented as a trained convoluted neural network (CNN) 1350. In operation, the UAS 1310 executes a flight pattern to search for a desired object. The UAS 1310 continually images the water below, generating a stream of images 1312. In various embodiments, the stream of images 1312 may include one or more of visible spectrum images, infrared images, and/or other image types. The UAS 1310 also generates environmental data 1314, which is associated with the stream of images 1312. For example, the environmental data 1314 may include GPS coordinates of the UAS 1310 when the corresponding image was captured, time, date, and other data tracked and/or generated by the UAS 1310.

The stream of images 1312 is provided to MVA 1340, which performs real-time image analysis for object detection. If the MVA 1340 detects a desired object (e.g., a certain fish), then the image or a portion of the image including the detected object (e.g., a region of interest) and associated object detection information (e.g., a location in the image of the detected object) are input to the trained CNN 1350 to classify each object. The trained CNN 1350 may output an object classification along with a confidence value indicating a likelihood that the desired object has been detected. If a desired object is identified with a confidence value that exceeds a threshold, then a notification is transmitted to the mobile structure 1370. In some embodiments, a set of object data 1360 is transmitted to the mobile structure 1370, including the captured image, which may be provided with brackets or other indicia identifying the location of the object, object identifiers, confidence values, and/or associated environmental data.

In operation, the MVA and CNN are utilized to detect and identify objects in captured video images. By utilizing marine video analytics (MVA), the UAS 1310 can analyze the full video frame to detect object(s) that are on the water surface or visible underneath the water surface. In some embodiments, an initial detection phase includes analyzing captured images (e.g., images captured from a UAS camera that is pointed straight down) and detecting the presence of an object. Given the variety of sizes, shapes and visibility of marine objects, the initial detection phase can efficiently catch more objects than a CNN that is specifically trained to identify certain marine objects (e.g., fish). The MVA also helps overcome various issues of training a CNN to identify the wide range of marine objects (e.g., amorphic objects like bait balls, that are constantly changing size and shape, yet represent an object that may be important to detect in some implementations). Understanding that training a CNN and ensuring a UAS is in optimal position to supply quality images to the CNN may be difficult and inefficient. The MVA provides an opportunity for a more simplistic initial identification method.

After an object is detected by the MVA, the image(s) (e.g., full image, object region, etc.) can then be run through the CNN in attempts to identify the object. If the system identifies the object (e.g. a tuna), a notification can be shared with the vessel, along with video confirmation and positional coordinates of the object. With this information the user can then elect whether to proceed to the object's location, either manually, or via an integrated autopilot.

As stated earlier, the images of various marine objects may be inconsistent, making identification challenging in certain situations. In the event an object is detected, but the CNN is unable to identify the object, a series of subsequent procedures could be followed to improve the CNN's ability to identify the object. These procedures may include, but are not limited to, lowering altitude to increase the number of pixels making up the target, physically or electronically zooming on an object to increase pixels on target, and/or circling the objects in attempts to gain a superior viewing angle.

Unlike real world imagery-based CNNs, sonar and radar CNNs do not provide the same level of visual distinction between objects. As a result, they may include additional data points to help guide the object identification processes. Examples of additional data that may be used for sonar fish species identification include date, time, geographical location, sea surface temperature, bottom density/composition, fish object depth, vessel speed, transducer frequency, transducer beam shape, sonar ping rate, and/or external fish migration reports.

Examples of additional data that may be used for radar bird/species identification include date, time, geographical location, target amplitude, target return signal Doppler pattern, and/or external bird migration reports.

Camera position may affect the success of the MVA/CNN processes and the maritime environment can create extremely difficult visualization scenarios. Scenarios may include solar glare, thick fog and constantly-changing sea state. To address solar glare, the UAS may be configured to position itself and its camera with the sun at its back. Algorithms for positioning the camera may receive sensor information, the location of the UAS, time of day, sunrise and sunset timing, etc. to assist with the positioning process.

Thick fog can also limit visibility, which can be addressed by configuring the UAS's to operate at low altitudes to minimize the distance from the surface (e.g., a distance allowing the UAS to capture an image through the fog). The use of wide angle lenses would help mitigate the field of view loses at low altitudes. The UAS may further include logic to prevent low altitude collision with objects. For example, the UAS may be configured with collision avoidance sensors and flight control operations for automatic evasive maneuvers.

Varying sea states creates an even more complex problem, as cresting waves can present themselves as "objects" to a MVA algorithm. Internet-based sea state reports for any given location can be utilized to adjust MVA detection filters to help reduce the number of false alarms created by heavier swells and waves.

In various embodiments, the UAS is configured to perform methods to help adapt to the scenario and increase the chance of a successful CNN object identification. In addition to basic maneuvers to improve visibility, more intelligent processes can be followed if the user is in pursuit of a specific object. For example, if the user is fishing for striped bass, assumptions can be made regarding the size of the species (e.g. 25 lb, 36"L×6"W×8"H) and the assumptions can be used in conjunction with camera specifications to understand how many pixels the species represents at any given altitude. From these, the UAS can be configured to automatically optimize its altitude, camera angle, and other settings to maximize the FOV while still ensuring a range that will provide the minimum necessary pixels on target for a proper MVA detection and/or CNN identification.

By identifying a desired search area (manually or via acknowledgement of a system generated recommendation), the UAS will take off and fly a search pattern to search for desired targets. Manual search patterns may be an area identified by the user, along with a pattern and direction of flight to complete the pattern. Automated fishing patterns are more complicated, in that they can take into account a number of inputs to generate a search area that has the greatest potential of encountering a marine object. For example, a search pattern can be constructed to search around areas known to have a high probability of fish. These additional inputs can include, but are not limited to sea surface temperature, chlorophyll levels, ocean currents, tide tables, water color and clarity, and/or bottom topography.

Figure 9:
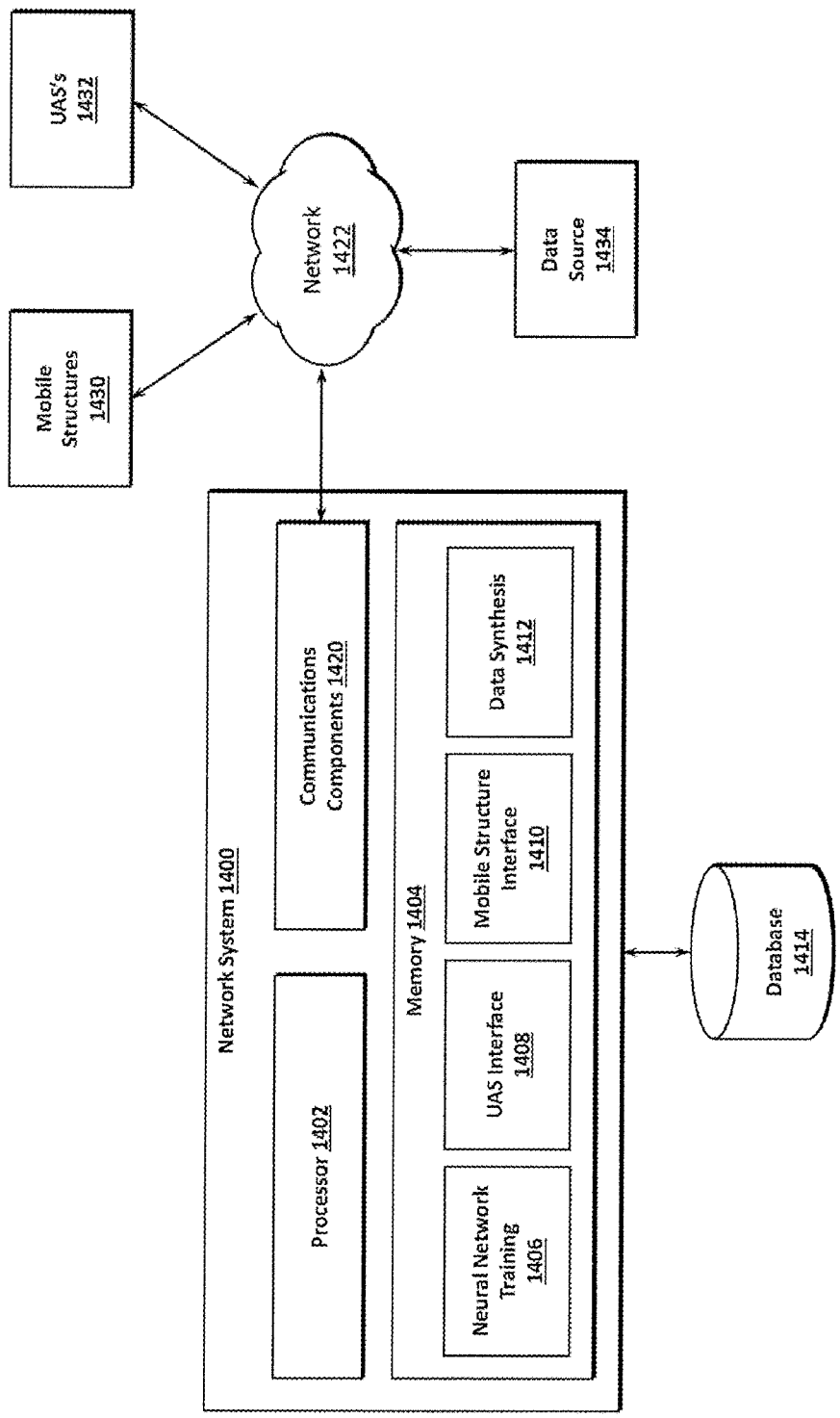
FIG. 9 illustrates an example network system for use with the mobile structure and UAV in accordance with one or more embodiments of the disclosure.

Referring to FIG. 9, an example network system for use with the mobile structure and UAV of the present disclosure will now be described in accordance with one or more embodiments. The network system 1400 may be implemented in one or more network servers, web servers, cloud servers, cloud storage and/or other networked devices. In the illustrated embodiment, the network system 1400 is implemented on one or more systems or servers such as an application server that performs data processing and/or other software execution operations to facilitate the operation of mobile structures, UAVs and/or other systems disclosed herein. In some embodiments, the components of the network system 1400 may be distributed across a communications network, such as communications network 1422. The communications network 1422 may include one or more local networks such as a wireless local area network (WLAN), wide area networks such as the Internet, and other wired or wireless communications paths suitable for facilitating communications between components described herein. The network system 1400 includes communications components 1420 configured to facilitate communications with one or more mobile structure 1430, UAVs 1432 and/or data source 1434.

In the illustrated embodiment, the network system 1400 includes one or more processors 1402 that perform data processing and/or other software execution operations and a database 1414 that stores data used by the system. The processor 1402 may include logic devices, microcontrollers, processors, application specific integrated circuits (ASICs), field programmable gate arrays (FPGAs) or other devices that may be used by the network system 1400 to execute appropriate instructions, such as software instructions stored in memory 1404, including neural network training component 1406, UAS interface 1408, mobile structure interface 1410, a data synthesis/fusion component 1412, and/or other applications. In some embodiments, the UAS configuration interface 1408 interfaces with a UAS or other system components to load relevant data, trained neural networks, and other information particular to the UAS (e.g., processing and memory constraints), the geographic region, and particular fish finding operations. The mobile structure configuration interface 1410 interfaces with a mobile structure or other system components to load relevant data, trained neural network, and other information particular to the mobile structure. For example, a UAS and/or mobile structure may only need data (e.g., maps, bottom contour information, fishing hot spots) relevant to the geographic region and target fish to be located.

In some embodiments, the UAS interface 1408 and the mobile structure interface 1410 are configured to upload data from the UAS and the mobile structure. The UAS, for example, may be configured to log data regarding detected objects (e.g., object identifier, time, date, location, captured image). The mobile structure, for example, may be configured to log sonar data regarding detected fish locations and bottom depth, radar data regarding detected bird locations, and other data as appropriate. The logged data may be uploaded to the database 1414 for further processing, including amalgamation with other UAS's, mobile structures and other data sources. In some embodiments, the data from the UAS is downloaded to a multifunction display of a boat and when the boat is within network range (e.g., within wireless range of an onshore network) the logged data is uploaded to network system 1400 and joined with data from other users.

The memory 1404 may be implemented in one or more memory devices (e.g., memory components) that store executable instructions, data and information used by the network system 1400. The network system 1400 may be configured to interface with various network devices, such as a desktop computer or network server, a mobile computing device such as a mobile phone, tablet, laptop computer or other computing device having communications circuitry (e.g., wireless communications circuitry or wired communications circuitry) for connecting with other devices in the network system 1400.

The communications components 1420 may include circuitry for communicating with other devices using various communications protocols. In various embodiments, communications components 1420 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 1420 may be further configured to interface with a wired network and/or device via a wired communication component such as an Ethernet interface, a power-line modem, and/or other appropriate components for wired communication. Proprietary wired communication protocols and interfaces may also be supported by communications components 1420

Figure 10:
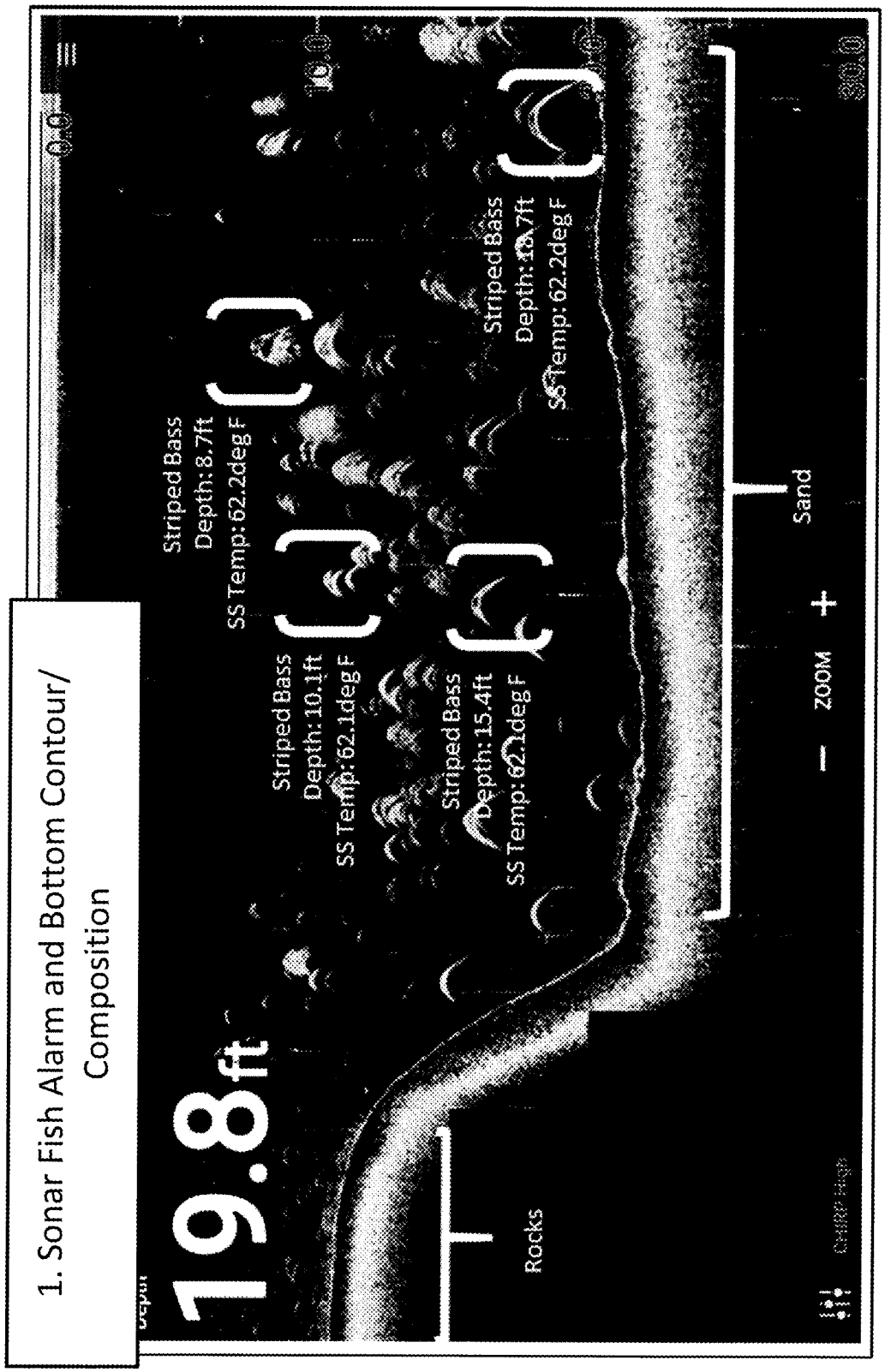
FIG. 10 illustrates example screen shots of external data in accordance with one or more embodiments of the disclosure.
Figure 10:
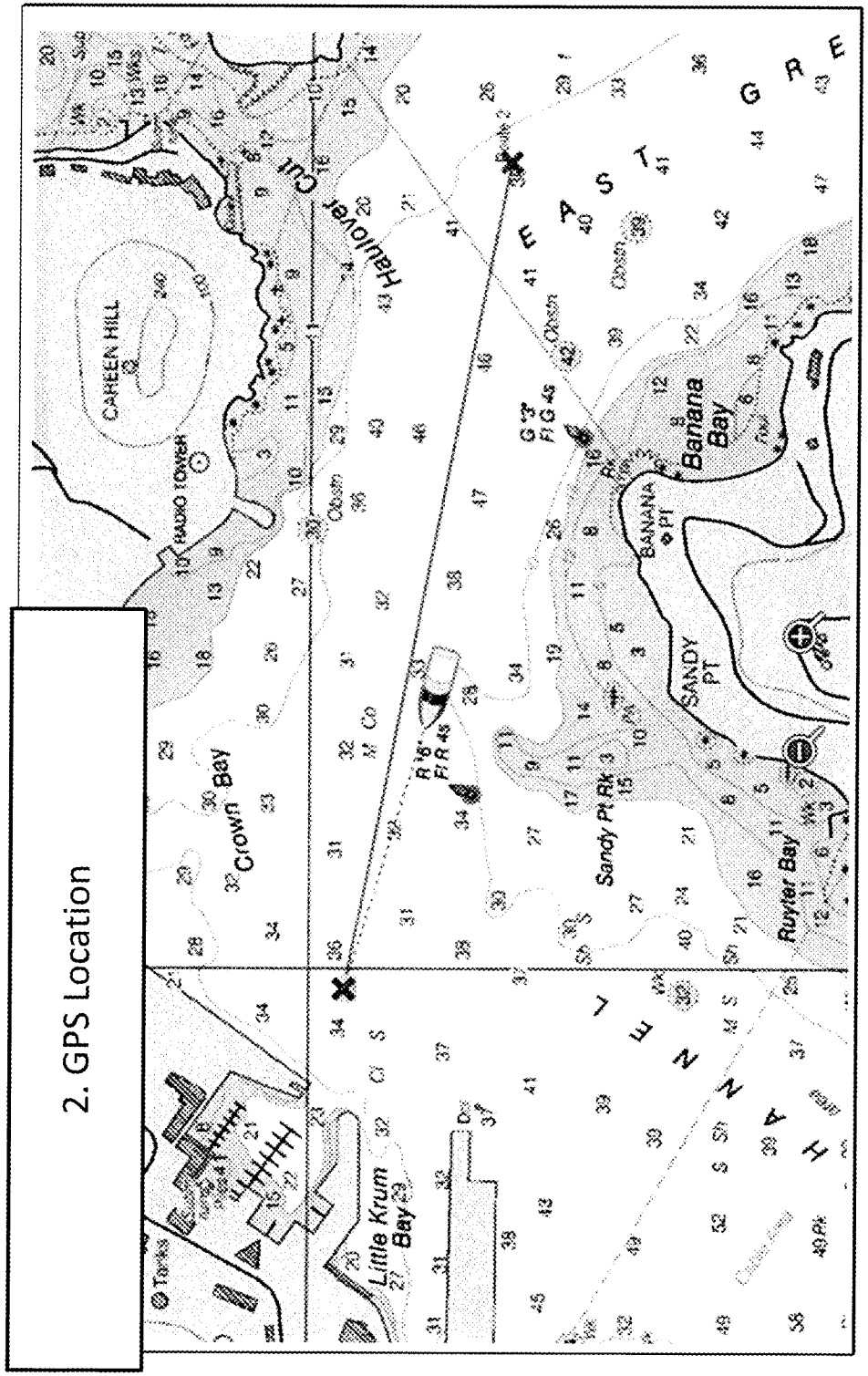
Figure 10:
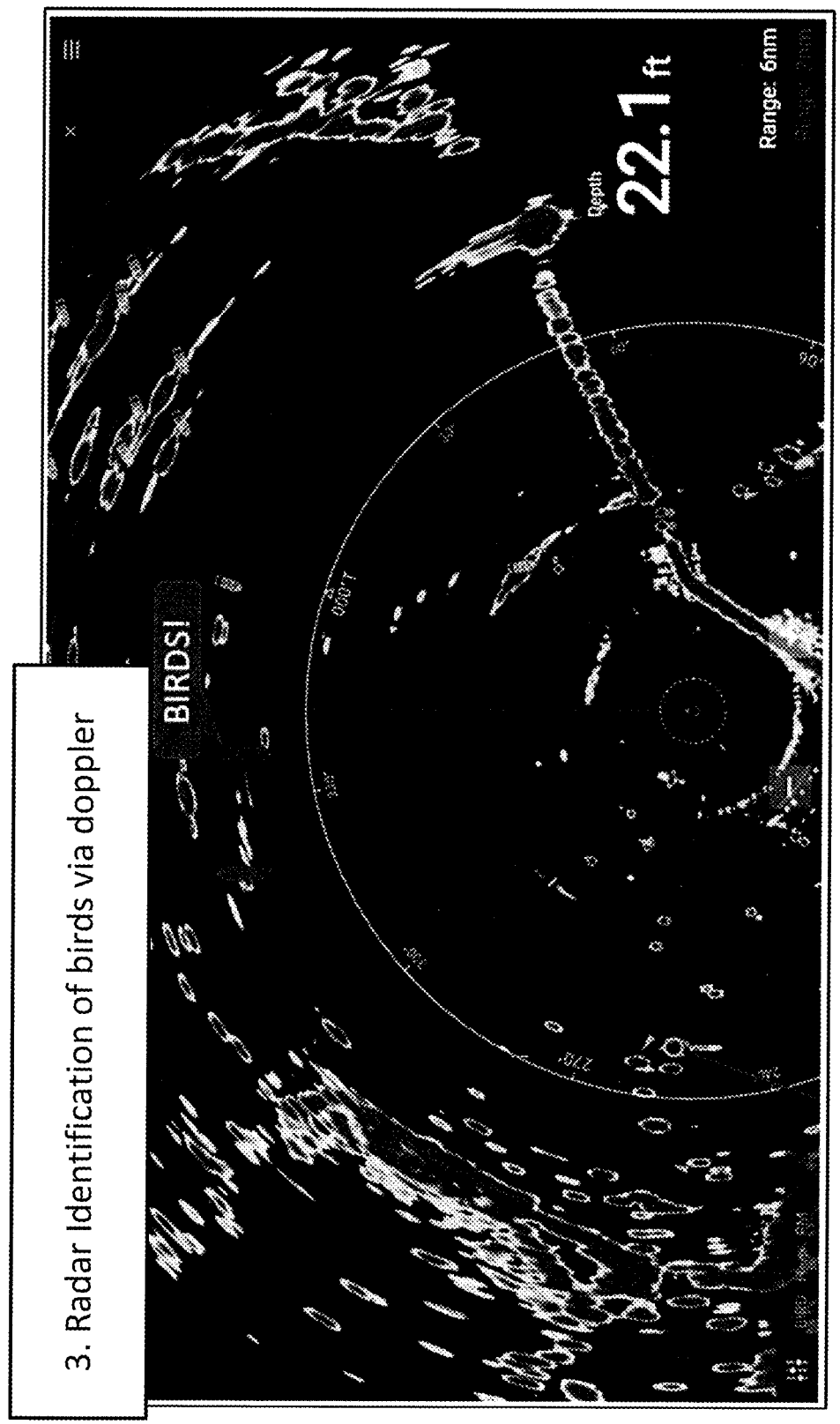
Figure 10:
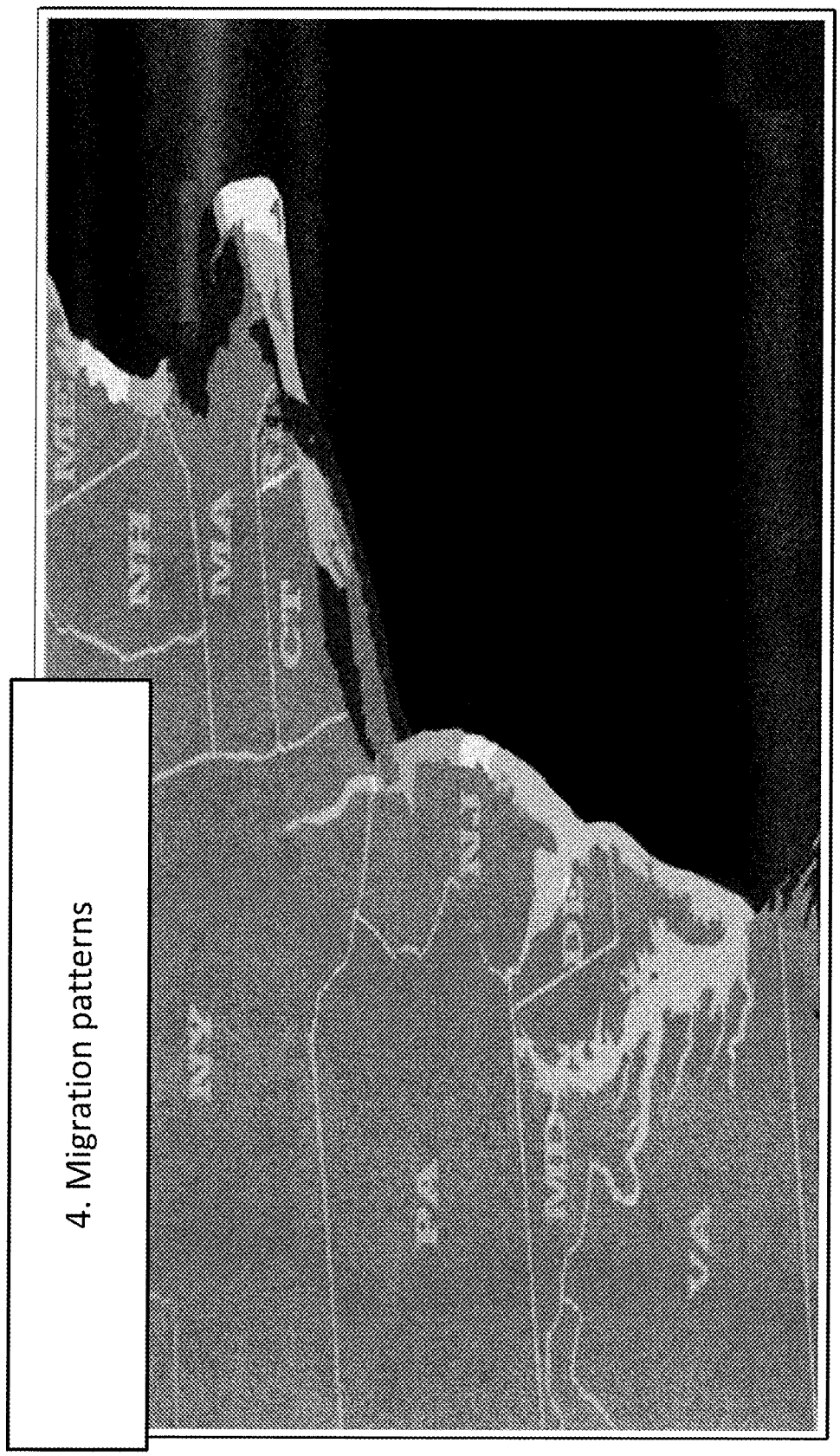
Figure 10:
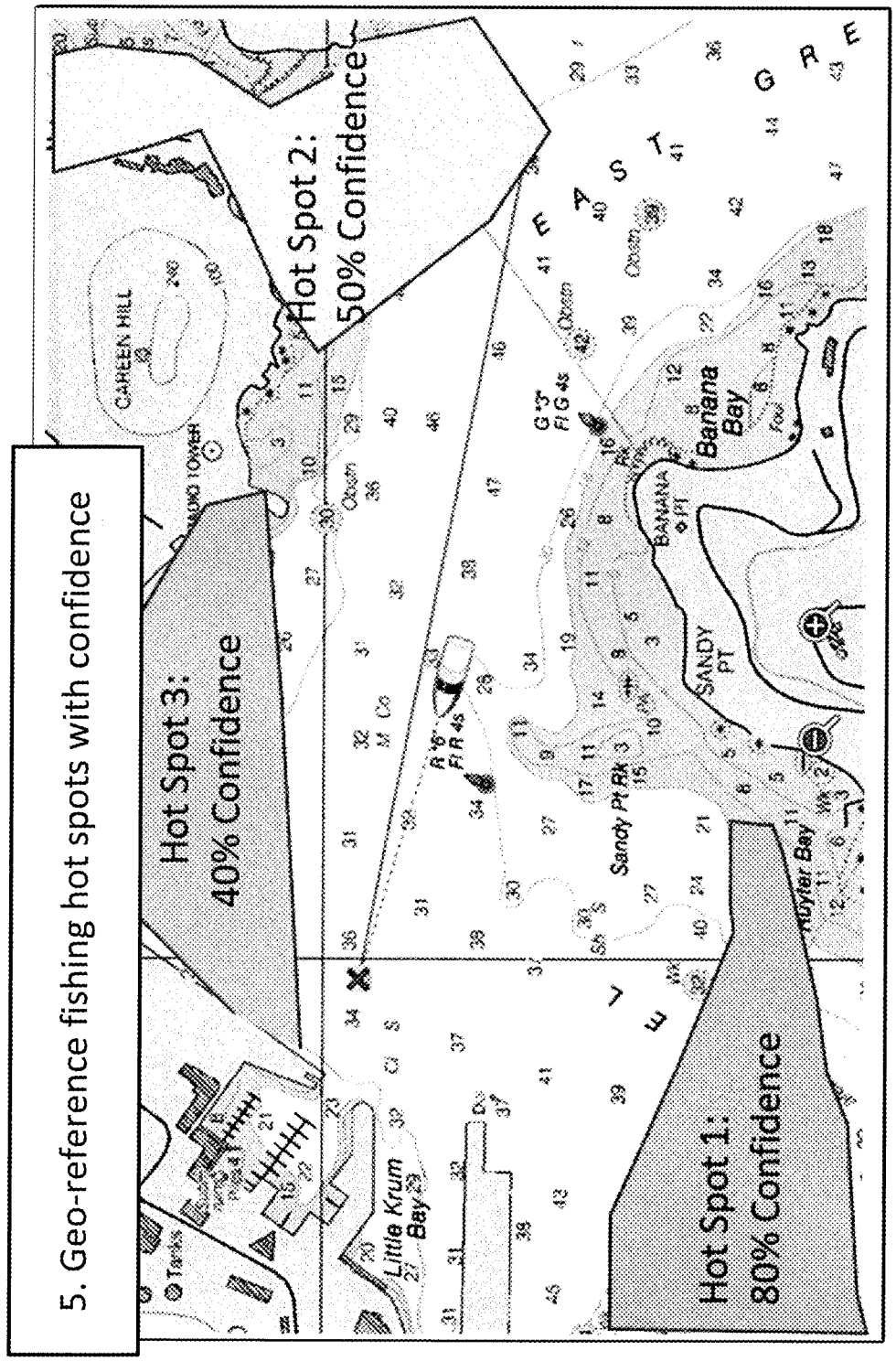

In various embodiments, the network system 1400 provides an access point for distributing and sharing of data used by the system and delivery of a subset of the data to the mobile structure 1430 and/or UAS 1432 for operation. The network system 1400 provides access to various data sources 1434, including sources providing third party data. For example, the network system 1400 may aggregate the latest fishing reports, object detection results from other mobile structures and UAS's, weather and marine forecasts, etc. for delivery to the mobile structures 1430 and/or UAS's 1432. Referring to FIG. 10, example screen shots of externally sourced data are illustrated showing data that may be used in accordance with one or more embodiments of the disclosure. For example, screen shot (a) illustrates sonar fish alarm and bottom contour/composition data that may be generated by a sonar system on the mobile structure and/or provided to the system; (b) illustrates a GPS location overlaid on a map that may include map data acquired from an external source (e.g., data source 1434) and GPS location data associated with a current position of a vessel and/or a destination, such as a location of a detected object; (c) illustrates identification of birds via doppler radar that may be used to identify a location of fish based, at least in part, on the feeding habits of certain birds (e.g., the location of birds on the water may be associated with fish beneath the surface); (d) illustrates seasonal migration patterns of certain fish that may be used in conjunction with other data (e.g., date, location, recent activity) to identify fish locations; and (e) illustrates an amalgamation of various data sources into known fishing hotspots with confidence factors representing a likelihood that fish may be found at the identified location.

In some embodiments, the database 1414 provides a repository of data captured one or more of the system components of described herein. For example, a sonar system providing bottom contour data may be gathered to from various sources for use by the system. The data repository may include any data that may be used to locate and identify fish, such as location, date, water temperature, and bottom depth, known migratory patterns, weather, lunar cycles, and barometric pressure, for example.

The network system 1400 further includes a neural network training component 1406 for generating the trained neural networks used by the UAS's during operation. The neural network may include at least one input layer, at least one hidden layer and at least one output layer. The neural network may receive a training dataset comprising a series of labeled images representing objects in regions of interest and output an object classification for each image. The training dataset may include images captured from an infrared, visible light, or another type of device that corresponds to the systems used by the UAS's and mobile structures. In some embodiments, the training dataset includes one or more synthetically generated or modified images. The training dataset may also include environmental or external data that may be available to the system. For example, the training dataset may include GPS coordinates, water temperature, desired fish, a date and time. In some embodiments, the training data may include any known data source that is available for locating and identifying certain fish, including the data illustrated in FIG. 10. In various embodiments, the neural network is trained by receiving available data (e.g., UAS data (e.g., GPS, captured images), mobile structure data (e.g., sonar data, radar data), and preloaded data (e.g., recent hotspots, migration patterns, water temperature), and extracting features from the available data for input to the neural network.

In some embodiments, the neural networks may be trained for particular classification tasks of interest which may be configured according to user preferences, recent sightings and reports, historical data and other capabilities. In one embodiment, the training system includes a MVA to analyze image data for detection. The MVA and/or the neural network may also provide additional feedback to the system to identify glare or other issues that may be handled through maneuvers to increase the chance of a better-quality image.

In one embodiment, the training starts with an analysis of the image using a MVA to detect objects and identify one or more regions of interest for further analysis. The output of the MVA is input to the neural network and processed in a forward pass through the neural network which may include feature extraction through a plurality of convolution layers and pooling layers, followed by object classification in a plurality of fully connected hidden layers and an output layer. Next, a backward pass through the neural network may be used to update the weighting parameters for nodes of the neural network to adjust for errors produced in the forward pass (e.g., misclassified objects). In various embodiments, other types of neural networks and other training processes may be used in accordance with the present disclosure.

Figure 11:
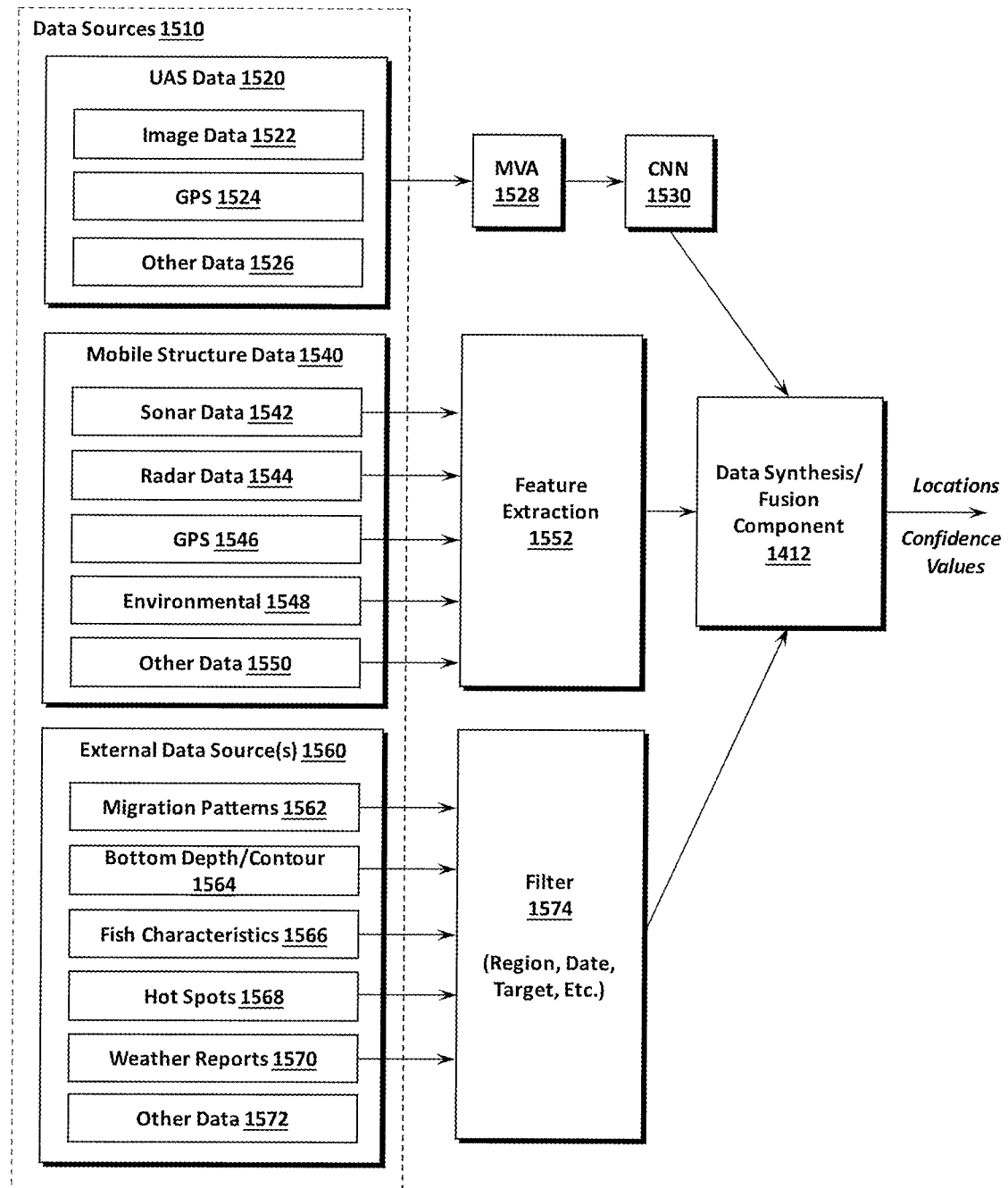
FIG. 11 illustrates an example data synthesis/fusion analysis in accordance with one or more embodiments of the disclosure.

In some embodiments, a combination of data analytics approaches may be used, including an MVA and trained neural network for object detection and classification from video and predictive metrics for one or more other data sources. In some embodiments, each data source may have a corresponding analytical tool to produce an associated confidence factor, and the various approaches are analyzed and combined using the data synthesis/fusion component 1412 to provide the user with an expert system. An example of a data synthesis/fusion component 1412, in accordance with one or more embodiments, is illustrated in FIG. 11.

The data synthesis/fusion component 1412 operates as an expert system to combine the various data sources 1510 into one or more recommendations, which may comprise one or more locations to search for a desired object with associated confidence values. In one embodiment, the output may be overlaid on a map (e.g., as illustrated in FIG. 10, screen shot (e)) to provide the user with a visual representation of recommended search areas. In the illustrated embodiment, the data sources 1510 include UAS data 1520, mobile structure data 1540, and external data sources 1560. The UAS data 1520 may include image data 1522 of the body of water from an aerial position as the UAS traverses a search pattern, GPS data 1524 and other data 1526 (e.g., other sensor data, temperature data, etc.). The UAS data 1520 is analyzed using marine video analytics (MVA 1528) to detect an object and a trained CNN 1530 to identify an object (and in some embodiments, a confidence factor). The output from the CNN 1530 may be provided to the data synthesis/fusion component 1412, along with other UAS data 1520 as appropriate.

The mobile structure data 1540 may include sonar data 1542, radar data 1544, GAS data 1546, environmental data 1548 (e.g., temperature, water temperature), and other data 1550 as available (e.g., data from other sensors). In one embodiment, a feature extraction module 1522 receives the raw data from the mobile structure and extracts features relevant to the search objectives. The features may then be provided to the data synthesis/fusion component 1412. External data source(s) 1560 may also be available, including data regarding migration patterns 1562, bottom depth/contour data 1564, fish characteristics 1566 (e.g., species, size, etc.), hot spots 1568, weather reports 1570 and other data 1572 that may be available. The external data source(s) 1560 may be filtered through filter 1574 to extract data relevant to the search objective (e.g., filter by target fish species, region, date and water temperature). The filtered data may then be provided to the data synthesis/fusion component 1412. In one embodiment, the data synthesis/fusion component 1412 analyzes the available data and produces a list of locations with corresponding confidence values.

The synthesis/fusion process may include aggregating data by location, producing a confidence factor for each location using a weighting factor, neural network or other process. The results may be overlaid on a map of locations with labels for appropriate confidence factors, a list of locations having the highest confidence factors, a recommended search strategy given a proximity of the recommended locations to the mobile structure, etc. In some embodiments, a data synthesis/fusion component 1412 is trained and tuned on the network system 1400, and a simplified data synthesis/fusion component and data set is downloaded to the mobile structure to provide near-real time analysis of available data to meet a designated search objective.

Where applicable, various embodiments provided by the present disclosure can be implemented using hardware, software, or combinations of hardware and software. Also, where applicable the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:
1. An apparatus comprising:
an unmanned aerial system (UAS) comprising a flight platform configured to execute a search path to search for an underwater object as the UAS flies over a sea and adjusts a minimum flight altitude based on sea calmness or choppiness;
an image capture device comprising image capture components configured to generate a stream of images corresponding to a field of view of the UAS;
a logic device associated with the UAS and configured to:
analyze the stream of images using a marine video analysis (MVA) system to detect a region of interest comprising an underwater object based on identifying an object of interest on and/or above a water surface and an association of the identified object with a presence of the underwater object, wherein the MVA system is configured to identify the object of interest on and/or above the water surface based at least in part on a detected size and/or shape;
after a region of interest is detected, process the stream of images associated with the region of interest through a neural network trained to identify the underwater object in the detected region of interest identified by the MVA; and
notify a mobile structure of the identified underwater object;
wherein the sea calmness or choppiness are obtained from analysis of visual and/or thermal data captured by the image capture device.

2. The apparatus of claim 1, wherein the logic device is further configured to:
determine a mobile structure route based, at least in part, on the notification of the identified object, including object location.

3. The apparatus of claim 2, wherein the search path is an automated search path based, at least in part, on chlorophyl levels and/or water color and/or water clarity.

4. The apparatus of claim 1, wherein the logic device is further configured to determine and communicate positioning instructions to the UAS, and wherein the positioning instructions are determined based, at least in part, on a movement vector of the mobile structure.

5. The apparatus of claim 1, wherein the mobile structure is configured to receive UAS data from a plurality of UASs associated with the mobile structure, filter the UAS data to identify objects associated with one or more target fish species, and display at least a portion of the filtered UAS data as an overlay on sonar, radar, vessel location, and/or fishing location maps.

6. The apparatus of claim 1, wherein the UAS is configured to optimize a flight altitude and/or camera angle to maximize the field of view while still ensuring a range that will provide a minimum number of pixels comprising target objects for MVA detection and neural network object identification.

7. The apparatus of claim 5, wherein the logic device is further configured to:
receive one or more search patterns, including environmental data including sun position, fog conditions, and/or sea conditions;
generate and transmit maneuvering and/or monitoring instructions for one or more of the UASs based on the received one or more search patterns, including orienting the UAS to mitigate solar glare, increase visibility, and/or avoid waves and/or swells; and monitor the UAS data received from the one or more of the UASs as they traverse the one or more search patterns for a detected object.

8. The apparatus of claim 1, wherein the neural network comprises a convolutional neural network configured to classify the object and generate an associated confidence value;
 wherein the classified object includes one or more fish, floating debris, seaweed patches, birds, and/or vessels; and
 wherein the confidence value indicates a probability of fish being present at a location associated with the classified object;
 wherein the logic device is further configured to:
  determine that the associated confidence value is below a threshold; and
  generate maneuvering instructions for the UAS to depart from the search path to capture higher quality images of the region of interest in response to determining that the associated confidence value is below the threshold.

9. The apparatus of claim 1, wherein the logic device is further configured to automatically notify the mobile structure after the underwater object is detected, the notification including the captured image, object identification, object location and/or other environmental data comprising date and time, global positioning satellite location, sea surface temperature, fish location and depth, fish type and size, bottom density and composition, and/or bird flock size.

10. A method comprising:
 capturing a stream of images from an image capture device coupled to an unmanned aerial system (UAS) associated with a mobile structure as the UAS flies over a sea and adjusts a minimum flight altitude based on sea calmness or choppiness;
 detecting, by a marine video analytics system (MVA), a region of interest comprising an underwater object in the captured stream of images based at least in part on identifying an object of interest on and/or above a water surface and an association of the identified object with a presence of the underwater object, wherein detecting, by the MVA, further comprises analyzing the stream of images for the object on and/or above the water surface based at least on a size and shape of the object;
 identifying, by a neural network trained to identify the underwater object from the output of the MVA, the underwater object in the region of interest, including an object classification and an associated confidence value;
 determining that the associated confidence value is below a threshold;
 generating maneuvering instructions for the UAS to capture higher quality images of the underwater object in response to determining that the associated confidence value is below the threshold; and
 notify a mobile structure of the identified object if the associated confidence value exceeds the threshold;
 wherein the sea calmness or choppiness are obtained from analysis of visual and/or thermal data captured by the image capture device.

11. The method of claim 10, further comprising:
 determining a mobile structure route based, at least in part, on a location of the underwater object.

12. The method of claim 10, further comprising:
 receiving UAS data from the UAS;
 filtering the UAS data to identify objects associated with one or more target fish species; and
 displaying at least a portion of the filtered UAS data received from the one or more UASs on a display of a user interface as an overlay on a sonar map, a radar map, a vessel location map and/or a fishing location map.

13. The method of claim 10, further comprising:
 receiving automated maneuvering and/or monitoring instructions for the UAS, including an automated search path based, at least in part, on chlorophyl levels; and
 transmitting the received maneuvering and/or monitoring instructions to the UAS.

14. The method of claim 10, further comprising:
 receiving one or more search patterns, including environmental data including sun position, fog conditions, and/or sea conditions;
 generating and transmitting maneuvering and/or monitoring instructions for the UAS based on the received one or more search patterns, including orienting the UAS to mitigate solar glare, increase visibility, and/or avoid waves and/or swells; and
 monitoring data received from the UAS as the UAS traverses the one or more search patterns.

15. The method of claim 10, further comprising:
 launching the UAS from the mobile structure; and
 optimizing a flight altitude and/or camera angle to maximize the field of view while still ensuring the minimum flight altitude.

16. The method of claim 14, further comprising:
 capturing the stream of images during execution of the one or more search patterns.

17. The method of claim 11, wherein the neural network comprises
 a convolutional neural network trained to identify the detected object and generate an associated confidence value;
 wherein the identified object includes one or more fish, floating debris, seaweed patches, birds, and/or vessels; and
 wherein the confidence value indicates a probability of fish being present at an underwater location associated with the classified object.

18. The method of claim 10, further comprising:
 communicating data from the UAS to the mobile structure including the captured image, object identification, object location and/or other environmental data comprising date and time, global positioning satellite location, sea surface temperature, fish location and depth, fish type and size, bottom density and composition, and/or bird flock size.

* * * * *

UNITED STATES PATENT AND TRADEMARK OFFICE
CERTIFICATE OF CORRECTION

PATENT NO. : 12,430,909 B2
APPLICATION NO. : 17/636838
DATED : September 30, 2025
INVENTOR(S) : Adam Murphy and Mark Johnson It is certified that error appears in the above-identified patent and that said Letters Patent is hereby corrected as shown below:

In the Specification

In the CROSS-REFERENCE TO RELATION APPLICATIONS:

Column 1, Lines 12-13, change "METHODS. which claims" to --METHODS, which claims"--.

Column 1, Line 20, change "U.S. Utility application Ser. No." to --U.S. Utility Application No.--.

Column 8, Lines 47-48, change "platform HO" to --platform 110--.

Column 14, Line 33, change "platform HO." to --platform 110.--.

Column 17, Line 50, change "UAS HO" to --UAS 110--.

Column 31, Line 2, change "GAS data 1546," to --GPS data 1546,--.

In the Claims

Claim 17, Column 34, Line 39, change "The method of claim 11," to --The method of claim 10,--.

Signed and Sealed this
Twenty-eighth Day of October, 2025

John A. Squires
*Director of the United States Patent and Trademark Office*